United States Patent
Holsen et al.

(10) Patent No.: US 11,347,330 B2
(45) Date of Patent: *May 31, 2022

(54) ADAPTIVE TRANSMIT VOLTAGE IN ACTIVE STYLUS

(71) Applicant: Wacom Co., Ltd., Saitama (JP)

(72) Inventors: Eivind Holsen, Trondheim (NO); Sharooz Shahparnia, Monte Sereno, CA (US); Kishore Sundara-Rajan, San Jose, CA (US); Trond Jarle Pedersen, Trondheim (NO); Vemund Kval Bakken, Tiller (NO); James D. Lyle, Santa Clara, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/129,351

(22) Filed: Dec. 21, 2020

(65) Prior Publication Data
US 2021/0109609 A1 Apr. 15, 2021

Related U.S. Application Data

(63) Continuation of application No. 16/173,764, filed on Oct. 29, 2018, now Pat. No. 10,871,835, which is a (Continued)

(51) Int. Cl.
*G06F 3/0354* (2013.01)
*G06F 1/3234* (2019.01)
(Continued)

(52) U.S. Cl.
CPC ........ *G06F 3/03545* (2013.01); *G06F 1/3259* (2013.01); *G06F 3/0383* (2013.01);
(Continued)

(58) Field of Classification Search
CPC ...... G06F 3/033; G06F 3/0383; G06F 3/0346; G06F 3/0354; G06F 3/03542;
(Continued)

(56) References Cited

U.S. PATENT DOCUMENTS

| 4,695,680 A | 9/1987 | Kable |
| 5,973,677 A | 10/1999 | Gibbons |

(Continued)

FOREIGN PATENT DOCUMENTS

WO 2012129247 A2 9/2012

OTHER PUBLICATIONS

Holsen, U.S. Appl. No. 14/642,128, Non-final Office Action, dated Apr. 28, 2016.
(Continued)

*Primary Examiner* — Nathan Danielsen
(74) *Attorney, Agent, or Firm* — Seed IP Law Group LLP

(57) ABSTRACT

In one embodiment, an active stylus includes a receiver and a transmitter configured to receive and transmit signals from and to a device via a touch sensor of the device, wherein the transmitter is integrated with or comprises an adaptive voltage generation circuit including: a boost voltage controller; a comparator; a switch control; and a bleeder circuit. The active stylus further includes a stylus controller configured to: (a) in a first operation state, control the adaptive voltage generation circuit and the transmitter to transmit signals at a second transmit voltage, and (b) in a second operation state different from the first operation state, control the adaptive voltage generation circuit and the transmitter to transmit signals at a first transmit voltage lower than the second transmit voltage.

20 Claims, 17 Drawing Sheets

Related U.S. Application Data continuation of application No. 15/462,959, filed on Mar. 20, 2017, now Pat. No. 10,114,484, which is a continuation-in-part of application No. 15/008,835, filed on Jan. 28, 2016, now abandoned, and a continuation of application No. 14/642,128, filed on Mar. 9, 2015, now Pat. No. 9,606,641, said application No. 15/008,835 is a continuation of application No. 13/329,274, filed on Dec. 17, 2011, now Pat. No. 9,250,719.

(60) Provisional application No. 61/553,114, filed on Oct. 28, 2011.

(51) Int. Cl.
  *G06F 3/038* (2013.01)
  *G06F 3/044* (2006.01)
  *G06F 3/041* (2006.01)

(52) U.S. Cl.
  CPC .............. *G06F 3/041* (2013.01); *G06F 3/044* (2013.01); *G06F 3/0416* (2013.01); *G06F 3/0441* (2019.05); *G06F 3/0442* (2019.05); *G06F 3/0446* (2019.05); *G06F 3/04162* (2019.05); *G06F 3/04164* (2019.05); *G06F 3/04166* (2019.05); *G06F 2203/04105* (2013.01); *G06F 2203/04108* (2013.01); *Y02D 10/00* (2018.01)

(58) Field of Classification Search
  CPC .............. G06F 3/03545; G06F 3/03546; G06F 3/038–0386; G06F 3/041–0416; G06F 3/044–0446; G06F 3/047; G06F 2203/04101; G06F 2203/04105; G06F 2203/04108; G06F 1/3234; G06F 1/325; G06F 1/3259; H05B 45/00; H05B 45/37; H05B 45/38; Y02D 10/00
  See application file for complete search history.

(56) References Cited

U.S. PATENT DOCUMENTS

| | | | |
|---|---|---|---|
| 7,612,767 | B1 | 11/2009 | Griffin et al. |
| 7,663,607 | B2 | 2/2010 | Hotelling et al. |
| 7,864,503 | B2 | 1/2011 | Chang |
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |
| 8,040,326 | B2 | 10/2011 | Hotelling et al. |
| 8,049,732 | B2 | 11/2011 | Hotelling et al. |
| 8,179,381 | B2 | 5/2012 | Frey et al. |
| 8,217,902 | B2 | 7/2012 | Chang et al. |
| 8,723,824 | B2 | 5/2014 | Myers et al. |
| 9,189,121 | B2 | 11/2015 | Shahparnia et al. |
| 9,250,719 | B2 | 2/2016 | Shahparnia et al. |
| 9,557,833 | B2 | 1/2017 | Sundara-Rajan et al. |
| 2002/0039092 | A1 | 4/2002 | Shigetaka |
| 2005/0171714 | A1 | 8/2005 | Ely et al. |
| 2008/0067998 | A1 | 3/2008 | Lee et al. |
| 2008/0238885 | A1 | 10/2008 | Zachut et al. |
| 2008/0309635 | A1 | 12/2008 | Matsuo |
| 2009/0010317 | A1 | 1/2009 | Mirzaei et al. |
| 2009/0078474 | A1 | 3/2009 | Fleck et al. |
| 2009/0095540 | A1 | 4/2009 | Zachut et al. |
| 2009/0115725 | A1 | 5/2009 | Shemesh et al. |
| 2009/0127005 | A1 | 5/2009 | Zachut et al. |
| 2009/0153152 | A1 | 6/2009 | Maharyta et al. |
| 2009/0184939 | A1 | 7/2009 | Wohlstadter et al. |
| 2009/0251434 | A1 | 10/2009 | Rimon et al. |
| 2009/0315854 | A1 | 12/2009 | Matsuo |
| 2010/0006350 | A1 | 1/2010 | Elias |
| 2010/0090988 | A1 | 4/2010 | Park |
| 2010/0155153 | A1 | 6/2010 | Zachut |
| 2010/0292945 | A1 | 11/2010 | Reynolds et al. |
| 2010/0315384 | A1 | 12/2010 | Hargreaves et al. |
| 2011/0007029 | A1 | 1/2011 | Ben-David |
| 2011/0050618 | A1 | 3/2011 | Murphy et al. |
| 2011/0130096 | A1 | 6/2011 | Dunkars |
| 2012/0013555 | A1 | 1/2012 | Maeda et al. |
| 2012/0068964 | A1 | 3/2012 | Wright et al. |
| 2012/0182254 | A1 | 7/2012 | Jang et al. |
| 2012/0242588 | A1 | 9/2012 | Myers et al. |
| 2012/0242592 | A1 | 9/2012 | Rothkopf et al. |
| 2012/0243151 | A1 | 9/2012 | Lynch |
| 2012/0243719 | A1 | 9/2012 | Franklin et al. |
| 2012/0327041 | A1 | 12/2012 | Harley et al. |
| 2012/0327042 | A1 | 12/2012 | Harley et al. |
| 2012/0331546 | A1 | 12/2012 | Falkenburg et al. |
| 2013/0021303 | A1 | 1/2013 | Martin et al. |
| 2013/0076612 | A1 | 3/2013 | Myers |
| 2013/0106713 | A1 | 5/2013 | Shahparnia et al. |
| 2013/0106715 | A1 | 5/2013 | Shahparnia et al. |
| 2013/0106795 | A1 | 5/2013 | Sundara-Rajan et al. |
| 2013/0207938 | A1 | 8/2013 | Ryshtun et al. |
| 2014/0002422 | A1 | 1/2014 | Stern et al. |
| 2016/0209940 | A1 | 7/2016 | Geller et al. |
| 2016/0266663 | A1 | 9/2016 | Holsen |
| 2017/0010699 | A1 | 1/2017 | Shahparnia et al. |

OTHER PUBLICATIONS

Holsen, U.S. Appl. No. 14/642,128, Notice of Allowance, dated Nov. 10, 2016.
Holsen, U.S. Appl. No. 14/642,128, Response to Office Action, dated Sep. 28, 2016.
Kyung, Ki-Uk et al., "wUbi-Pen : Windows Graphical User Interface Interacting with Haptic Feedback Stylus," SIGGRAPH,, Los Angeles, California, 2008.
Lee, Johnny C. et al., "Haptic Pen: A Tactile Feedback Stylus for Touch Screens," UIST '04, vol. 6, Issue 2, Santa Fe, New Mexico, 2004.
Lynch, "Electronic Devices With Convex Displays," U.S. Appl. No. 61/454,950, filed Mar. 21, 2011, 28 pages.
Myers et al., "Electronic Devices With Concave Displays," U.S. Appl. No. 61/454,936, filed Mar. 21, 2011, 23 pages.
Rothkopf et al., "Electronic Devices With Flexible Displays" U.S. Appl. No. 61/454,894, filed Mar. 21, 2011, 41 pages.
Shahparnia, U.S. Appl. No. 13/329,274, Advisory Action, dated Jan. 12, 2015.
Shahparnia, U.S. Appl. No. 13/329,274, Non-final Office Action, dated Mar. 6, 2015.
Shahparnia, U.S. Appl. No. 13/329,274, Notice of Allowance, dated Sep. 25, 2015.
Shahparnia, U.S. Appl. No. 13/329,274, Final Office Action, dated Sep. 11, 2014.
Shahparnia, U.S. Appl. No. 13/329,274, Non-final Office Action, dated Jan. 3, 2014.
Shahparnia, U.S. Appl. No. 13/329,274, RCE and Amendment, dated Feb. 11, 2015.
Shahparnia, U.S. Appl. No. 13/329,274, Response to Office Action, dated May 5, 2014.
Shahparnia, U.S. Appl. No. 13/329,274, Response to Office Action, dated Dec. 11, 2014.
Shahparnia, U.S. Appl. No. 13/329,274, Response to Office Action, dated Jun. 8, 2015.
Shahparnia, U.S. Appl. No. 15/008,835, Non-final Office Action, dated Feb. 2, 2017.
Song, Hyunyoung et al., "Grips and Gestures on a Multi-Touch Pen," *CHI 2011, Session: Flexible Grips & Gestures*, Vancouver, BC, Canada, 2011.
Tan, Eng Chong et al., "Application of Capacitive Coupling to the Design of an Absolute-Coordinate Pointing Device," IEEE Transactions on Instrumentation and Measurement, vol. 54, No. 5, 2005.

ADAPTIVE TRANSMIT VOLTAGE IN ACTIVE STYLUS

TECHNICAL FIELD

This disclosure generally relates to touch sensors and styluses.

BACKGROUND

A touch sensor may detect the presence and location of a touch or the proximity of an object (such as a user's finger or a stylus) within a touch-sensitive area of the touch sensor overlaid on a display screen. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DETAILED DESCRIPTION

Figure 1:
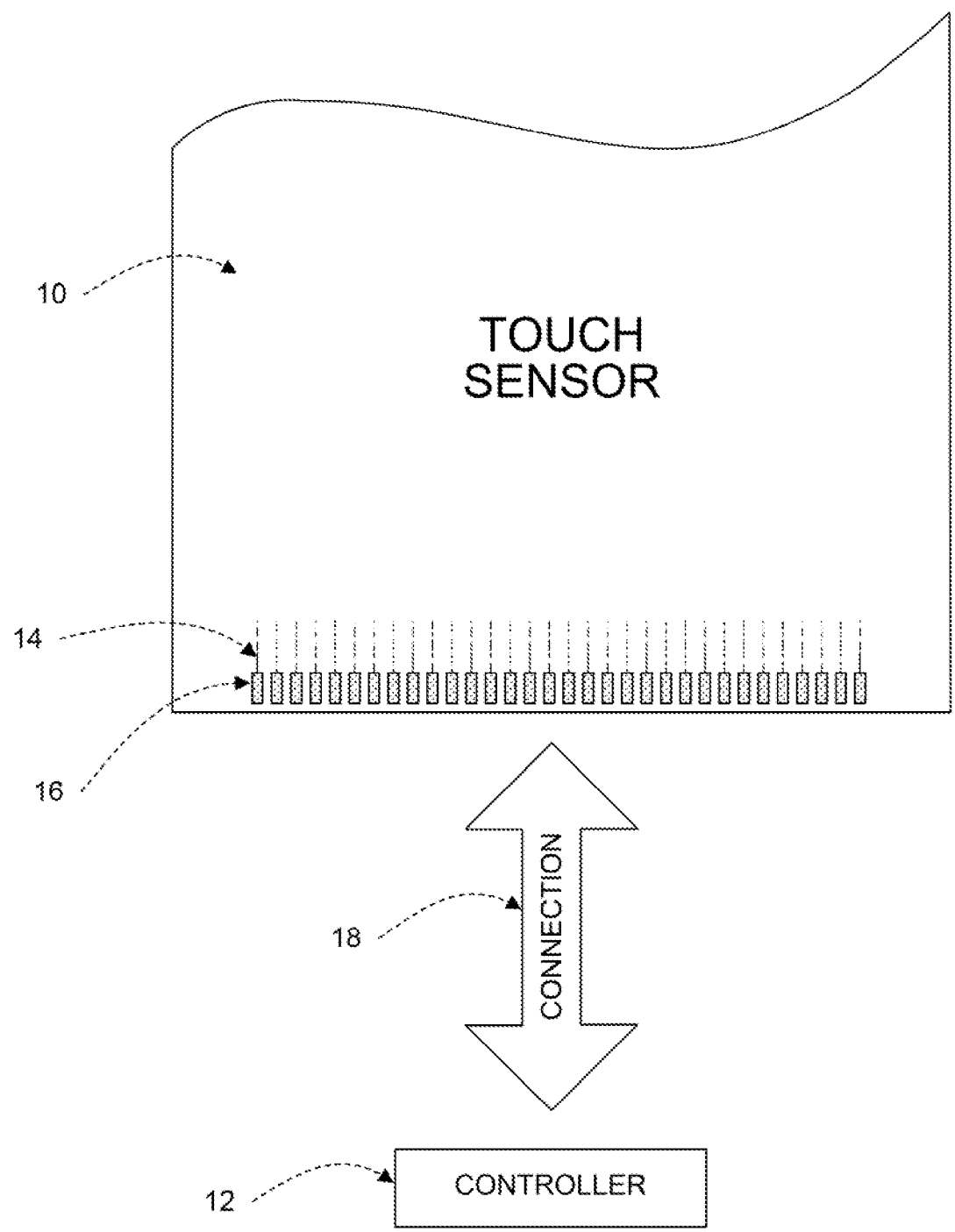
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, diamond, snowflake, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal (FLM) or other conductive material, such as for example copper, silver, carbon, or a copper-, silver-, or carbon-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. As yet another example, one or more portions of the conductive material may be carbon or carbon-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive electrode line running horizontally or vertically or in any suitable orientation. Similarly, one or more sense electrodes may together form a sense electrode line running horizontally or vertically or in any suitable orientation. Additionally, one or more ground electrodes may together form a ground electrode line running horizontally or vertically or in any suitable orientation. In particular embodiments, drive electrode lines may run substantially perpendicular to sense electrode lines. In particular embodiments, drive electrode lines may run substantially parallel to sense electrode lines. Herein, reference to a drive electrode line may encompass one or more drive electrodes making up the drive electrode line, and vice versa, where appropriate. Similarly, reference to a sense electrode line may encompass one or more sense electrodes making up the sense electrode line, and vice versa, where appropriate. Additionally, reference to a ground electrode line may encompass one or more ground electrodes making up the ground electrode line, and vice versa, where appropriate. In particular embodiments, any electrode may be configured as a drive, sense, or ground electrode and the configuration of any electrode may be changed during operation of touch sensor 10. In particular embodiments, configuration of electrodes may be controlled by touch-sensor controller 12.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

In particular embodiments, touch sensor 10 may determine the position of an object (such as a stylus or a user's finger or hand) that makes physical contact with a touch-sensitive area of touch sensor 10. In addition or as an alternative, in particular embodiments, touch sensor 10 may determine the position of an object that comes within proximity of touch sensor 10 without necessarily contacting touch sensor 10. In particular embodiments, an object may come within proximity of touch sensor 10 when it is located some distance above a surface of touch sensor 10; when it hovers in a particular position above a surface of touch sensor 10; when it makes a motion (such as for example a swiping motion or an air gesture) above a surface of touch sensor 10; or any suitable combination of the above. In particular embodiments, determining the position of an object that comes within proximity of touch sensor 10 without making physical contact may be referred to as determining the proximity of an object. In particular embodiments, determining the proximity of an object may comprise determining the position of an object's projection onto touch sensor 10 when the object is located some distance above a plane of touch sensor 10. The projection of an object onto touch sensor 10 may be made along an axis that is substantially orthogonal to a plane of touch sensor 10. In particular embodiments, the position of an object's projection onto touch sensor 10 may be referred to as the position or the location of an object. As an example and not by way of limitation, touch sensor 10 may determine the position of an object when the object is located above the surface of touch sensor 10 and within a distance of approximately 20 mm of the surface of touch sensor 10. Although this disclosure describes or illustrates particular touch sensors 10 that may determine a position of physical contact of an object, a proximity of an object, or a combination of the two, this disclosure contemplates any suitable touch sensor 10 suitably configured to determine a position of physical contact of an object, a proximity of an object, or any suitable combination of one or more of the above.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. As yet another example, the conductive material of tracks 14 may be carbon or carbon-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground electrode lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electromechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
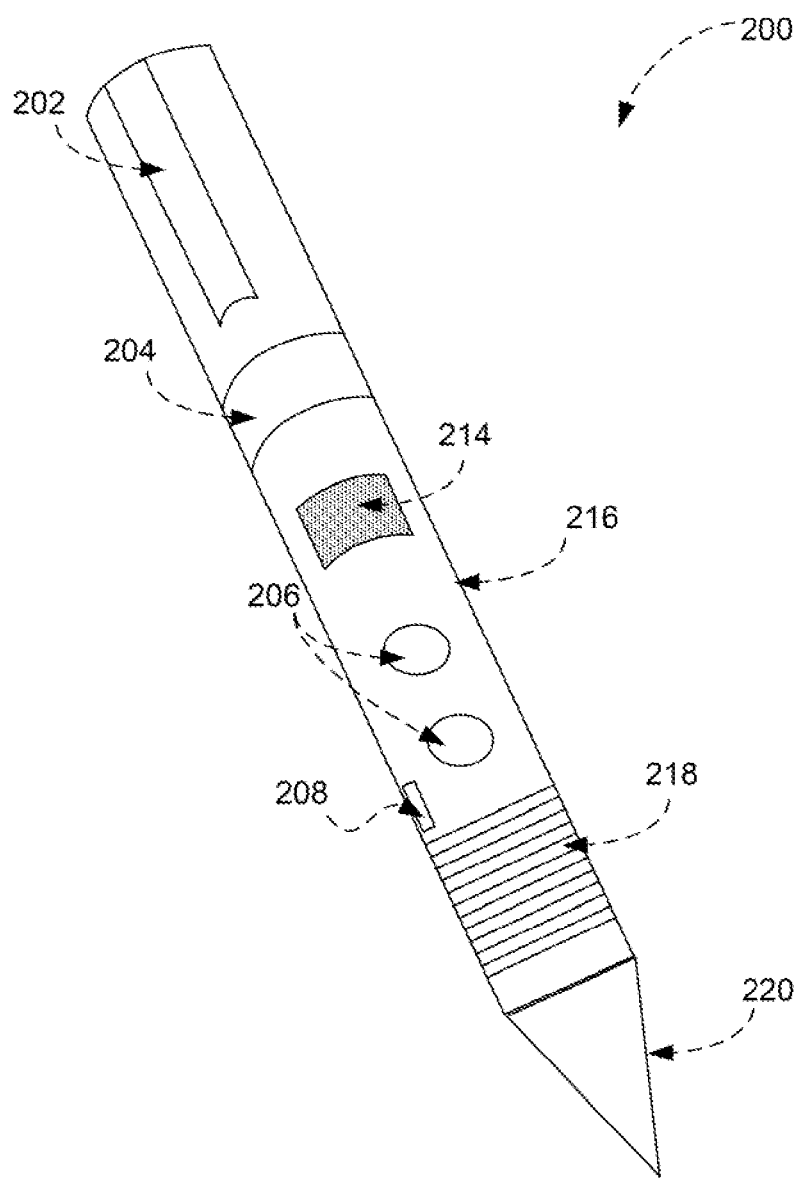
FIG. 2 illustrates an example active stylus exterior.

FIG. 2 illustrates an example exterior of active stylus 200. In the example of FIG. 2, active stylus 200 may include external components such as buttons 206, slider 202, slider 204, and tip 220. Furthermore, the external components may be integrated with outer body 216. Herein, reference to an active stylus may encompass one or more of a button (e.g., button 206), one or more of a slider (e.g., slider 202 or slider 204), or a tip (e.g., tip 220), where appropriate. In particular embodiments, it may be desirable for tip 220 to be a point at the edge of active stylus 200, where the point contacts touch sensor 10. In particular embodiments, tip 220 may be a nib of active stylus 200. In particular embodiments, active stylus 200 may be used in conjunction with touch sensor 10 of FIG. 1. As an example and not by way of limitation, active stylus 200 may provide touch or proximity inputs to touch sensor 10. In particular embodiments, one or more of the external components may enable one or more interactions between active stylus 200 and touch sensor 10, between active stylus 200 and a computing device of touch sensor 10, between active stylus 200 and a user (e.g., a user of the computing device and active stylus 200), or between touch sensor 10 and the user. As an example and not by way of limitation, an interaction between active stylus 200 and the computing device of touch sensor 10 may include communication between active stylus 200 and touch sensor 10, where active stylus 200 is hovering within proximity of touch sensor 10. When one of buttons 206 is pressed, active stylus 200 may send data to the computing device by injecting one or more suitable low-power and low-frequency electrical signals to touch sensor 10 via tip 220 of active stylus 200. As another example and not by way of limitation, an interaction between active stylus 200 and the user may include providing feedback to or accepting input from the user. In particular embodiments, one or more of the external components may interact with a stylus controller (e.g., stylus controller 306) of active stylus 200. As an example and not by way of limitation, tip 220 may include one or more pressure sensors. The pressure sensors may be operable to transmit tip pressure information to the stylus controller. The tip pressure information may indicate whether tip 220 is pressed against a surface of an object. In particular embodiments, tip 220 may travel. As an example and not by way of limitation, the travel may include a metal and/or a plastic rod pressing against a pressure sensor. As such, any force being applied to tip 220 may generate a corresponding pressure value in the pressure sensor based at least on the travel of tip 220. Furthermore, the corresponding pressure value in the pressure sensor may be generated as a pre-determined function of the force being applied to tip 220. An analog-to-digital converter (ADC) may measure the generated corresponding pressure value. In particular embodiments, one or more of the pressure sensors may include a sensor element that measures the force (being applied to tip 220) based at least on a change in resistance of a mechanical construction due to the applied force. Accordingly, the change in resistance may be measured by a circuit in a stylus controller of active stylus 200. In particular embodiments, one or more of the pressure sensors may include a capacitive sensor. Furthermore, a stylus controller of active stylus 200 may include a timer and/or a comparator that measure a rate of capacitive charge and/or discharge on the capacitive sensor. Accordingly, the stylus controller may measure the force (being applied to tip 220) based at least on the rate of capacitive charge and/or discharge on the capacitive sensor. As another example and not by way of limitation, one or more of buttons 206 may be operable to transmit information to the stylus controller. The transmitted information may indicate whether one or more of buttons 206 are pushed or activated. In particular embodiments, outer body 216 may have any suitable dimensions. Additionally, outer body 216 may be made of any suitable material or any suitable combinations of suitable materials. As an example and not by way of limitation, outer body 216 may be made of a conductive material in order to achieve galvanic or capacitive coupling to a human body. In particular embodiments, a thin dielectric layer that does not substantially affect a capacitive coupling of active stylus 200 with touch sensor 10 may be applied on the conductive material. Although this disclosure illustrates or describes particular exterior of particular active stylus, the disclosure contemplates any suitable exterior of any suitable active stylus. Moreover, although this disclosure illustrates or describes particular external components of particular active stylus operable to enable particular interactions, this disclosure contemplates any suitable external components operable to enable any suitable interactions in any suitable manner.

In particular embodiments, the external components may function as sliders, switches, rollers, trackballs, or wheels. As an example and not by way of limitation, slider 202 may function as a vertical slider that is aligned along a latitudinal axis of active stylus 200. As another example and not by way of limitation, slider 204 may function as a wheel that is aligned along a circumference of active stylus 200. As yet another example and not by way of limitation, buttons 206 may be implemented using one or more low-profile mechanical single-pole single-throw (SPST) on/off switches. In particular embodiments, one or more of slider 202, slider 204, or buttons 206 may be implemented using one or more touch sensors. The touch sensors may have any suitable shapes, dimensions, or locations. Furthermore, the touch sensors may be made from any suitable materials. As an example and not by way of limitation, each touch sensor may be implemented using flexible mesh of electrically-conductive materials. As another example and not by way of limitation, each touch sensor may be implemented using an FPC.

In particular embodiments, active stylus 200 may include grooves 218 on its outer body 216. Grooves 218 may have any suitable dimensions. Grooves 218 may be located at any suitable area on outer body 216 of active stylus 200. Grooves 218 may enhance a user's grip on outer body 216 of active stylus 200. In particular embodiments, surface 214 may be modified. Accordingly, modified surface 214 of active stylus 200 may possess properties that are different from rest of outer body 216. As an example and not by way of limitation, modified surface 214 may have a different texture, temperature, or electromagnetic characteristic from the rest of outer body 216. Modified surface 214 may form one or more components on outer body 216. Modified surface 214 may also be capable of dynamically altering one or more characteristics of active stylus 200. Furthermore, the user may interact with modified surface 214 to provide a particular interaction. As an example and not by way of limitation, dragging a finger across modified surface 214 may initiate a data transfer between active stylus 200 and touch sensor 10.

In particular embodiments, tip 220 may include one or more conductive rings to communicate data between active stylus 200 and touch sensor 10. In particular embodiments, the conductive rings may reside close to the terminal end of tip 220 in order to reduce attenuation loss of any electrical signals injected from active stylus 200 to touch sensor 10. In particular embodiments, the conductive rings of active stylus 200 may reside on its outer body 216 or any other suitable part of active stylus 200. In particular embodiments, a pressure sensor of tip 220 may provide or communicate pressure information (e.g., an amount of pressure being exerted by tip 220 of active stylus 200 against a surface of touch sensor 10) between active stylus 200 and touch sensor 10. Tip 220 may be made of any suitable material (e.g., an electrically conductive material) and possess any suitable dimension (e.g., a diameter of 1 mm or less at its terminal end). In particular embodiments, active stylus 200 may include port 208 at any suitable location on outer body 216. Port 208 may be configured to transfer signals or information between active stylus 200 and one or more computing devices via, for example, wired coupling. Port 208 may also transfer signals or information by any suitable low-powered technology, such as RS-232. Although this disclosure describes or illustrates particular active stylus comprising particular exterior configurations of particular components having particular locations, dimensions, compositions, or functionalities, this disclosure contemplates any suitable active stylus comprising any suitable exterior configurations of any suitable components having any suitable locations, dimensions, compositions, or functionalities.

Figure 3:
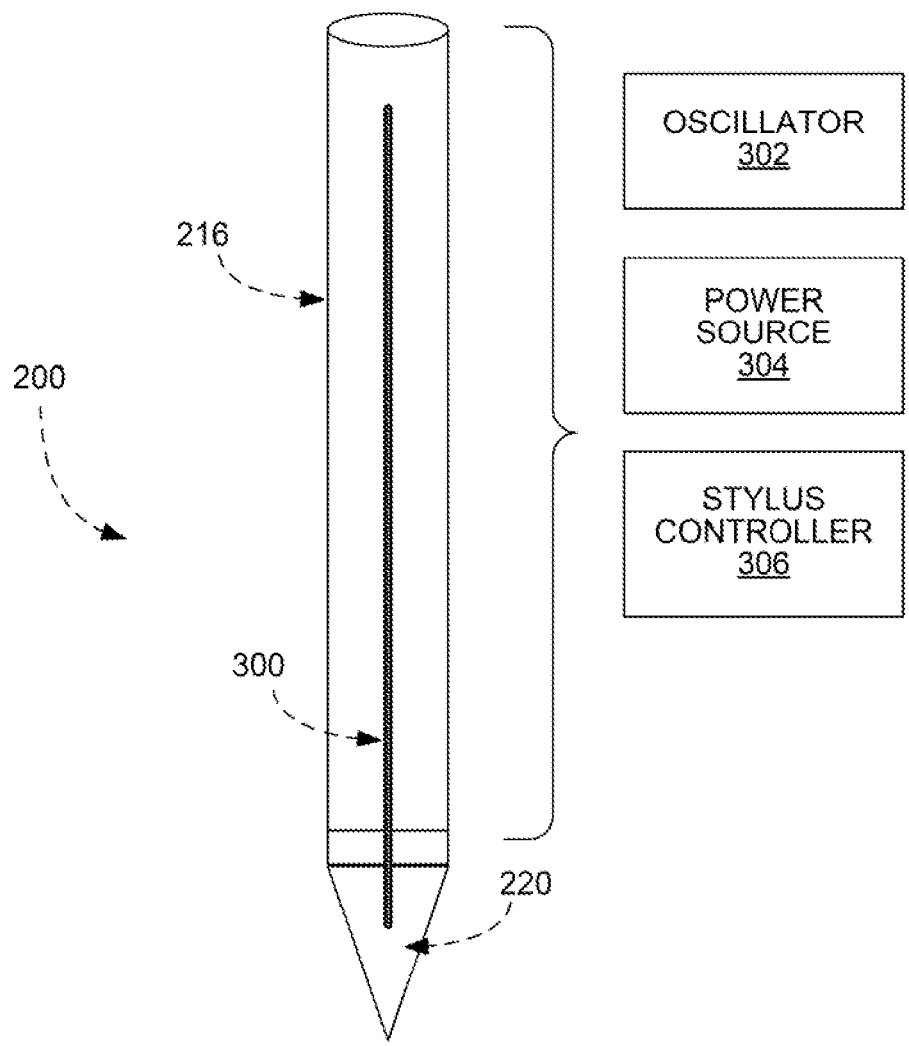
FIG. 3 illustrates example internal components of an active stylus.

FIG. 3 illustrates example internal components of active stylus 200. In the example of FIG. 3, active stylus 200 may include center shaft 300, oscillator 302, power source 304, and stylus controller 306. Although the disclosure describes or illustrates active stylus 200 having particular center shaft, particular oscillator, particular power source, and particular stylus controller, the disclosure contemplates any suitable combinations of one or more suitable center shafts, one or more suitable oscillators, one or more suitable power sources, and one or more suitable stylus controllers in any particular manner. In particular embodiments, active stylus 200 may inject electrical signals to one or more conductive rings of tip 220 via center shaft 300. In particular embodiments, oscillator 302 may toggle a voltage potential of tip 220 between GND voltage and one or more pre-determined voltage levels based at least on one or more electrical signals (e.g., the injected electrical signals via center shaft 300). As an example and not by way of limitation, oscillator 302 may generate an electrical signal corresponding to an oscillating sinusoid wave (or any other suitable smooth wave) having a frequency of approximately 2 kHz at approximately 15V and a maximum peak-to-peak output voltage swing of approximately 15V. As another example and not by way of limitation, oscillator 302 may include a modified Wien bridge oscillator configured to generate an electrical signal corresponding to a 2 kHz sinusoid electrical wave with a peak-to-peak output voltage amplitude swing of approximately 15V and a low level of distortion. As yet another example and not by way of limitation, oscillator 302 may generate an electrical signal corresponding to an oscillating sinusoid wave (or any other suitable smooth wave) having a frequency that is approximately between 14 kHz and 16 kHz and a maximum peak-to-peak output voltage amplitude swing of approximately between 25V and 32V. In particular embodiments, each button of buttons 206 may configure oscillator 302 to generate a distinct sinusoid wave signal of a particular frequency. As an example and not by way of limitation, a first button 206 may configure oscillator 302 to generate an approximate 1.5 kHz oscillating sinusoid wave signal and a second button 206 may configure oscillator 302 to generate an approximate 2 kHz oscillating sinusoid wave signal. In particular embodiments, oscillator 302 and its associated components in active stylus 200 may be designed such that generation of any sinusoid wave (or any suitable smooth wave) may immediately be halted following the release of one or more of buttons 206.

In particular embodiments, power source 304 may be any suitable source of stored energy including but not limited to electrical and chemical-energy sources. Such power source may be suitable for operating active stylus 200 without being replaced or recharged for lifetime of active stylus 200. Power source 304 may be a plurality of super capacitors, an alkaline battery, a rechargeable battery, any suitable long-life battery, or any suitable combinations thereof. As an example and not by way of limitation, power source 304 may be a 3V rechargeable battery. As another example and not by way of limitation, power source 304 may include one or more 1.5V alkaline batteries. In particular embodiments, when any one of buttons 206 is pressed while active stylus 200 operates in active mode, power source 304 may consume less than approximately 300 µA of current. When none of buttons 206 are pressed, power source 304 may consume less than approximately 0.3 µA in order to maintain active stylus 200 in idle mode. In other particular embodiments, active stylus 200 may be designed such that power source 304 consumes substantially negligible current when no buttons 206 are pressed. In particular embodiments, power source 304 may include a rechargeable battery. The rechargeable battery may be a lithium-ion battery or a nickel-metal-hydride battery. The lithium-ion battery may last for a substantially longer period of time (e.g., approximately 5-10 years) than the nickel-metal-hydride battery. Furthermore, the lithium-ion battery may power active stylus 200 when one of buttons 206 is pressed. In particular embodiments, power source 304 may also be charged by energy from a user. As an example and not by way of limitation, power source 304 may be charged by motion induced on active stylus 200 by the user. In particular embodiments, power source 304 of active stylus 200 may also receive power from a computing device or any other suitable external power source. As an example and not by way of limitation, energy may be inductively transferred from the computing device or any other suitable external power source (e.g., a wireless power transmitter). In particular embodiments, power source 304 may include one or more solar cells. In particular embodiments, power source 304 may also receive its power by a wired connection through an applicable port (e.g., port 208) coupled to a suitable external power supply. Although this disclosure describes or illustrates particular internal components of particular active stylus, the disclosure contemplates any suitable internal components of any suitable active stylus in any suitable manner.

In particular embodiments, referencing a battery (e.g., 1.5V alkaline battery) as power source 304, extending a life of the battery may be important. As such, power consumption by active stylus 200 may be an important factor for an extended life of the battery. In particular embodiments, a transmit circuitry (e.g., transmitter 402 of FIG. 4) of active stylus 200 may consume a substantial majority of power. As an example and not by way of limitation, the transmit circuitry may inject electrical signals into one or more conductive rings of active stylus 200, in order to communicate data between active stylus 200 and touch sensor 10, as discussed above. In particular embodiments, a transmit voltage of the transmit circuitry may be the most important electrical parameter to be considered for reducing power consumption by the transmit circuitry. As an example and not by way of limitation, a dynamic power consumption of the transmit circuitry may be directly proportional to a multiplicative product of $C_{Load}$, $f_{Tx}$, and $(V_{Tx})^2$. In particular embodiments, $C_{Load}$ may correspond to an output capacitive load of the transmit circuitry associated with an electrical signal (e.g., signal 412 of FIG. 4) generated (e.g., output) by the transmit circuitry. $f_{Tx}$ may correspond to an average frequency of the electrical signal generated by the transmit circuitry. $V_{Tx}$ may correspond to a transmit voltage (e.g., transmit voltage amplitude) of the electrical signal generated by the transmit circuitry. Accordingly, active stylus 200 may consume more power as $C_{Load}$ increases, $f_{Tx}$ increases, $V_{Tx}$ increases, or any suitable combinations thereof. Furthermore, based at least on the dynamic power consumption, $V_{Tx}$, (i.e., transmit voltage) may be the most important electrical parameter of the dynamic power consumption by the transmit circuitry. As an example and not by way of limitation, dynamic power consumption of the transmit circuitry may increase exponentially with $V_{Tx}$.

Figure 4:
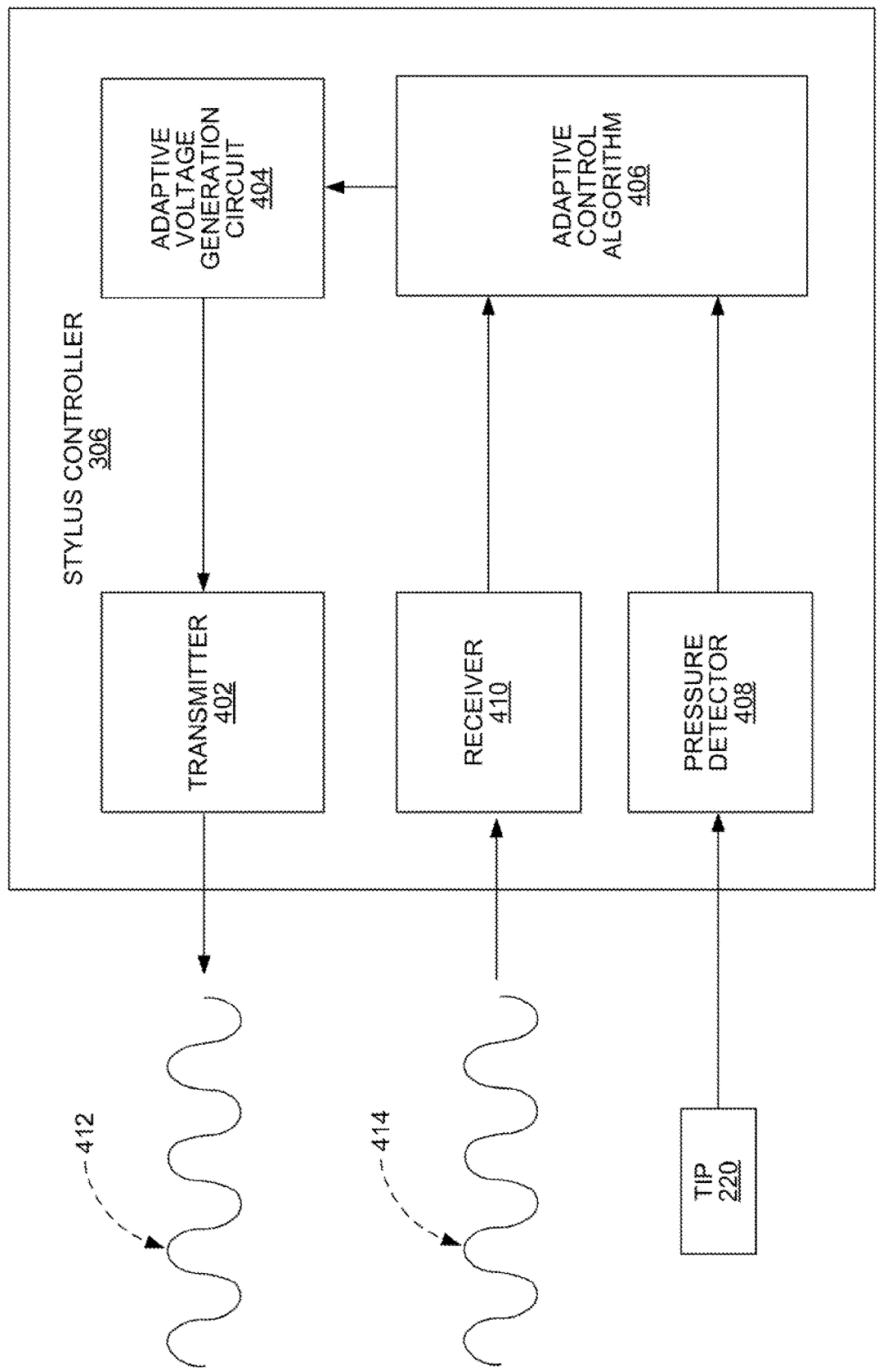
FIG. 4 illustrates an example controller for an active stylus.

FIG. 4 illustrates stylus controller 306 of active stylus 200. In the example of FIG. 4, stylus controller 306 may be a semiconductor integrated circuit (IC) chip that includes one or more intellect property (IP) cores. As an example and not by way of limitation, the IP cores of stylus controller 306 may include an IP core for pressure detector 408, an IP core for receiver 410, an IP core for adaptive control algorithm 406, an IP core for adaptive voltage generation circuit 404, and an IP core for transmitter 402. Although the disclosure describes or illustrates particular semiconductor IC chip of particular active stylus comprising particular IP cores corresponding to particular pressure detector, particular receiver, particular adaptive control algorithm, particular adaptive voltage generation circuit, and particular transmitter, the disclosure contemplates one or more suitable semiconductor IC chips of any suitable active stylus comprising any suitable combinations of one or more suitable IP cores corresponding to one or more of any suitable pressure detector, any suitable receiver, any suitable adaptive control algorithm, any suitable adaptive voltage generation circuit, or any suitable transmitter in any suitable manner. As an example and not by way of limitation, the IP core corresponding to transmitter 402 may be implemented in a different semiconductor IC chip. As another example and not by way of limitation, the IP core corresponding to receiver 410 may be implemented in a different semiconductor IC chip. In particular embodiments, an active stylus may be a transmit-only (Tx-only) stylus. As an example and not by way of limitation, the Tx-only active stylus may not receive any signals (e.g., signals for synchronizing communication between the active stylus and a touch sensor) from touch sensors. As such, the Tx-only active stylus may not include any IP core corresponding to receiver 410. In particular embodiments, an active stylus may be a transmit/receive (Tx/Rx) active stylus. As an example and not by way of limitation, the Tx/Rx active stylus may be active stylus 200 of FIG. 4. As such, the Tx/Rx active stylus may transmit signals to a touch sensor and receive signals from the touch sensor. Furthermore, the Tx/Rx active stylus may include IP cores corresponding to one or more suitable transmitters (e.g., transmitter 402) and one or more suitable receivers (e.g., receiver 410) for transmitting and receiving signals to and from the touch sensor.

In particular embodiments, stylus controller 306 may include an IP core for pressure detector 408. Pressure detector 408 may receive information from a pressure sensor of tip 220. The information may indicate whether tip 220 is pressed against a touch sensor. As an example and not by way of limitation, the information may indicate whether tip 220 is pressed against a surface of touch sensor 10. In particular embodiments, pressure detector 408 may include an analog-to-digital converter (ADC) that converts analog pressure measurements received from tip 220 (e.g., pressure sensor of tip 220) into one or more digital data for delivery to adaptive control algorithm 406. Thereafter, pressure detector 408 may send the digital data to the IP core corresponding to adaptive control algorithm 406. Although the disclosure describes or illustrates particular IP core corresponding to particular pressure detector that detects particular tip of particular active stylus pressing against particular touch sensor in a particular manner, the disclosure contemplates any suitable IP core corresponding to any suitable pressure detector that detects any suitable tip of any suitable active stylus pressing against any suitable touch sensor in any suitable manner.

In particular embodiments, stylus controller 306 may include an IP core for receiver 410. Receiver 410 may receive signal 414 from a computing device through a touch sensor of the computing device. As an example and not by way of limitation, receiver may receive signal 414 from a computing device through touch sensor 10. In particular embodiments, the computing device may be a touch screen. As an example and not by way of limitation, the touch screen may include a display and a touch sensor (e.g., touch sensor 10) with a touch-sensitive area. The display may be a liquid crystal display (LCD), a light-emitting diode (LED) display, a LED-backlight LCD, or other suitable display. Furthermore, the display may be visible through a cover panel and one or more substrates (with the drive and sense electrodes that are disposed on the substrates) of the touch screen. In particular embodiments, the computing device may include electronics that provide one or more functionalities. As an example and not by way of limitation, the computing device may include circuitry or any other suitable electronics for wireless communication to or from the computing device, executing programs on the computing device, generating graphical or other user interfaces (UIs) for the computing device to display to a user, managing power to the computing device from a battery or other suitable power sources, recording multimedia content, any other suitable functionality, or any suitable combinations thereof. In particular embodiments, active stylus 200 and a controller (e.g., touch-sensor controller 12) of the touch sensor may be synchronized prior to communication of data between active stylus 200 and the computing device. As an example and not by way of limitation, active stylus 200 may be synchronized to the controller through a pre-determined bit sequence transmitted by the touch sensor. As such, signal 414 may include the pre-determined bit sequence transmitted by the touch sensor. As another example and not by way of limitation, active stylus 200 may be synchronized to the controller by processing a drive signal transmitted by one or more electrodes of the touch sensor. As such, signal 414 may include the drive signal. As yet another example and not by way of limitation, active stylus 200 may be synchronized with the controller through a pre-determined bit sequence sent from active stylus 200 and received by the touch sensor. In particular embodiments, signal 414 received by receiver 410 may include an electrical signal generated by one or more electrodes of touch sensor. In the example of FIG. 4, receiver 410 may measure a signal strength of the electrical signal and transmit the signal strength measurement of the electrical signal to the IP core corresponding to adaptive control algorithm 406. As an example and not by way of limitation, receiver 410 may measure a peak-to-peak voltage amplitude of the electrical signal and transmit the measured peak-to-peak voltage amplitude of the electrical signal to adaptive control algorithm 406. In particular embodiments, receiver 410 may measure the signal strength of the electrical signal when active stylus 200 is operating in an Active mode (as discussed below) and hovering above touch sensor 10. As an example and not by way of limitation, referencing FIG. 9B, receiver 410 may measure the signal strength of the electrical signal when active stylus 200 is in the Active mode and hovering at a distance 904 above surface 902 of touch sensor 10. Although the disclosure describes or illustrates particular IP core corresponding to particular receiver that receives and measures particular signal from particular touch sensor in a particular manner, the disclosure contemplates any suitable IP core corresponding to any suitable receiver that receives and measures any suitable signal from any suitable touch sensor in any suitable manner. Moreover, although the disclosure describes particular computing device of particular touch sensor in a particular manner, the disclosure contemplates any suitable computing device of any suitable touch sensor in any suitable manner.

In particular embodiments, stylus controller 306 may include an IP core for adaptive control algorithm 406. Adaptive control algorithm 406 may be implemented by one or more firmware. In particular embodiments, adaptive control algorithm 406 may adapt (e.g., adjust) a voltage of electrical signals transmitted to a touch sensor by active stylus 200. As an example and not by way of limitation, adaptive control algorithm 406 may adjust a voltage of signal 412 being transmitted to touch sensor 10 by transmitter 402 of stylus controller 306. As another example and not by way of limitation, adaptive control algorithm 406 may send a signal to IP core corresponding to adaptive voltage generation circuit 404, where the signal indicates a suitable voltage for transmitting signal 412 (e.g., sets up a suitable actual transmit voltage for signal 412). Herein, reference to a voltage of electrical signals transmitted to a touch sensor from an active stylus may encompass an actual transmit voltage of the active stylus, or vice-versa, where appropriate. In particular embodiments, adaptive control algorithm 406 may adjust the actual transmit voltage by reading information retrieved from IP core corresponding to pressure detector 408. As an example and not by way of limitation, adaptive control algorithm 406 may adjust the actual transmit voltage based at least on whether pressure detector 408 determines that tip 220 of active stylus 200 is pressed against the touch sensor. As an example and not by way of limitation, referencing FIG. 9A, when tip 220 of active stylus 200 is pressed against surface 902 of touch sensor 10, adaptive control algorithm 406 may instruct adaptive voltage generation circuit 404 of active stylus 200 to transmit electrical signals to a computing device of touch sensor 10 through touch sensor 10 at a first actual transmit voltage (e.g., 6V). As another example and not by way of limitation, referencing FIG. 9B, when tip 220 of active stylus 200 is not pressed against surface 902 of touch sensor 10 (instead, hovering at distance 904 above surface 902 of touch sensor 10), adaptive control algorithm 406 may instruct adaptive voltage generation circuit 404 to transmit electrical signals to the computing device through touch sensor 10 at a second actual transmit voltage (e.g., 24V) that is higher than the first actual transmit voltage. In particular embodiments, adaptive control algorithm 406 may adjust the actual transmit voltage by reading information being sent from IP core corresponding to receiver 410. As an example and not by way of limitation, the information may include the measured strength of signal 414 received by receiver 410 and sent from touch sensor 10, as discussed above. Accordingly, adaptive control algorithm 406 may adjust the actual transmit voltage based at least on the measured strength of signal 414. As an example and not by way of limitation, adaptive control algorithm 406 may increase the actual transmit voltage as the measured strength of signal 414 decreases, or vice-versa, where appropriate. In particular embodiments, referencing FIGS. 9A-9B, adaptive control algorithm 406 may adjust the actual transmit voltage based on the measured strength of signal 414 only when active stylus 200 is hovering at distance 904 above surface 902 of touch sensor 10 (e.g., see FIG. 9B) and not when active stylus 200 presses against surface 902 of touch sensor 10 (e.g., see FIG. 9A). In particular embodiments, an actual transmit voltage instructed by adaptive control algorithm 406 while active stylus 200 is hovering above a touch sensor (and not touching the touch sensor) may be higher than another actual transmit voltage instructed by adaptive control algorithm 406 while active stylus 200 is pressed against the touch sensor. Although the disclosure describes or illustrates particular IP core corresponding to particular adaptive control algorithm adapting particular actual transmit voltage of particular active stylus based on particular strength of particular signal received from particular touch sensor, or particular pressure of particular tip of the active stylus against the touch sensor, in a particular manner, the disclosure contemplates any suitable IP core corresponding to any suitable adaptive control algorithm adapting any suitable actual transmit voltage of any suitable active stylus based on any suitable strength of any suitable signal received from any suitable touch sensor, or any suitable pressure of any suitable tip of the active stylus against the touch sensor, in any suitable manner. Moreover, although the disclosure describes or illustrates particular adaptive control algorithm for adapting particular actual transmit voltage of particular active stylus in a particular manner, the disclosure contemplates any suitable adaptive control algorithm for adapting any suitable actual transmit voltage of any suitable active stylus in any suitable manner. In particular embodiments, adaptive control algorithm 406 may also consider one or more power consumption dependencies of active stylus 200, or signal-to-noise ratio (SNR) of signal 412 of active stylus 200, for adapting the actual transmit voltage of transmitter 402, as discussed below. Adaptive control algorithm 406 may also consider a transmit scheme (or transmission payload) of signal 412 for adapting the actual transmit voltage of transmitter 402. Adaptive control algorithm 406 may also consider a vendor of touch-sensor controller 12 for adapting the actual transmit voltage of transmitter 402, as discussed below.

In particular embodiments, stylus controller 306 may include an IP core for adaptive voltage generation circuit 404. In the example of FIG. 4, adaptive voltage generation circuit 404 may receive as input a signal from IP core corresponding to adaptive control algorithm 406 and generate an actual transmit voltage for IP core corresponding to transmitter 402 based on the received signal. In particular embodiments, the generated actual transmit voltage may include one or more programmable transmit voltage levels (e.g., 5.5V to 24V at increments of 1V) that may be generated dynamically by adaptive voltage generation circuit 404. Such programmable transmit voltage levels may optimize power consumption (e.g., current consumption of power source 304) of active stylus 200. In particular embodiments, the actual transmit voltage of signal 412 may be substantially higher than a voltage of power source 304. As an example and not by way of limitation, power source 304 may include a 1.5V alkaline battery and the actual transmit voltage may range from approximately 6V to 24V. As such, the substantially higher actual transmit voltage may enable active stylus 200 to communicate with touch sensor 10 whilst hovering at a distance away from a surface of touch sensor 10. In particular embodiments, the adaptive voltage generation circuit 404 may include one or more boost (e.g., step-up) voltage controllers for configuring the actual transmit voltage (e.g., 24V) from a voltage (e.g., 1.5V) of power source 304 (e.g., alkaline battery). Furthermore, the step-up voltage controllers may maintain (i.e., regulate) the actual transmit voltage at a particular voltage amplitude. In particular embodiments, adaptive voltage generation circuit 404 may include one or more bleeder circuits to regulate the actual transmit voltage within a pre-determined time (e.g., from approximately 24V to 6V in approximately 5 ms). In particular embodiments, adaptive voltage generation circuit 404 may include a slow start mechanism (e.g., a slow start firmware) that operates adaptive voltage generation circuit 404 to avoid high in-rush currents during initial sequences of boosting (e.g., pumping) the actual transmit voltage. In particular embodiments, adaptive voltage generation circuit 404 may include an auto refresh mode for reduce current consumption. In particular embodiments, adaptive voltage generation circuit 404 may include a gate protection that ensures adaptive voltage generation circuit 404 is disabled when a general purpose input output (GPIO) pin of stylus controller 306 is pulled to GND. In particular embodiments, active voltage generation circuit 404 may include one or more direct current (DC) voltage converters. As an example and not by way of limitation, active voltage generation circuit 404 may include two DC voltage converters (not shown in FIG. 4). A first DC voltage converter may convert a voltage (e.g., 1.5V) of power source 304 (e.g., alkaline battery) to an intermediate voltage (e.g., approximately 2.7V) based at least on an efficiency level (e.g., approximately 85%) of the first DC voltage converter. The intermediate voltage may form a DC voltage input to a second DC voltage converter. In particular embodiments, the intermediate voltage may be higher than the voltage of power source 304. In particular embodiments, the intermediate voltage may correspond to a system voltage of stylus controller 306. Furthermore, the second DC voltage converter may convert the intermediate voltage into an actual transmit voltage for transmitter 402 based at least on an instructed voltage generated by adaptive control algorithm 406 as discussed above and an efficiency level of the second DC voltage converter. In particular embodiments, the second DC voltage converter may be a programmable DC voltage converter that converts the intermediate voltage into the actual transmit voltage. In particular embodiments, one or more of the DC voltage converters may include a boost voltage controller. The boost voltage controller may generate the actual transmit voltage for transmitter 402 from a relatively lower voltage (e.g., system voltage of stylus controller 306) as discussed below. Although this disclosure describes or illustrates particular IP core corresponding to particular adaptive voltage generation circuit for generating particular actual transmit voltage based at least on particular DC voltage converters and particular instructed voltage generated by particular adaptive control algorithm in a particular manner, the disclosure contemplates any suitable IP core corresponding to any suitable adaptive voltage generation circuit for generating any suitable actual transmit voltage based at least on one or more suitable DC voltage converters and any suitable instructed voltage generated by any suitable adaptive control algorithm in any suitable manner.

Figure 9B:
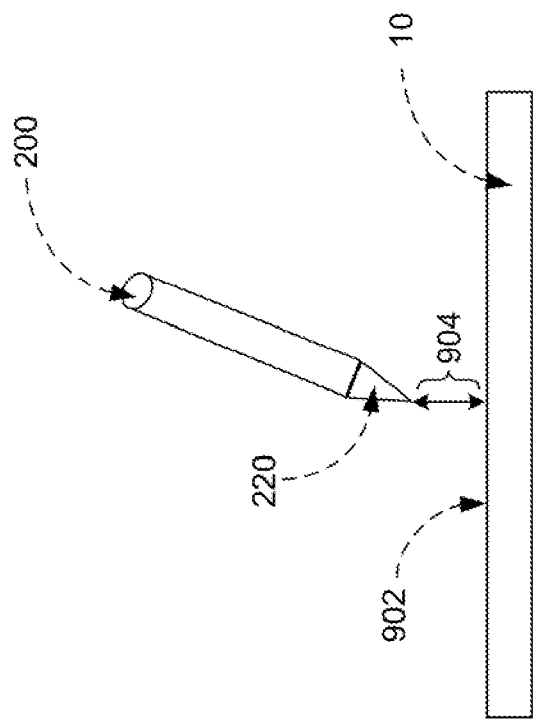
FIGS. 9A-9B illustrate an example active stylus with a touch sensor.
Figure 9A:
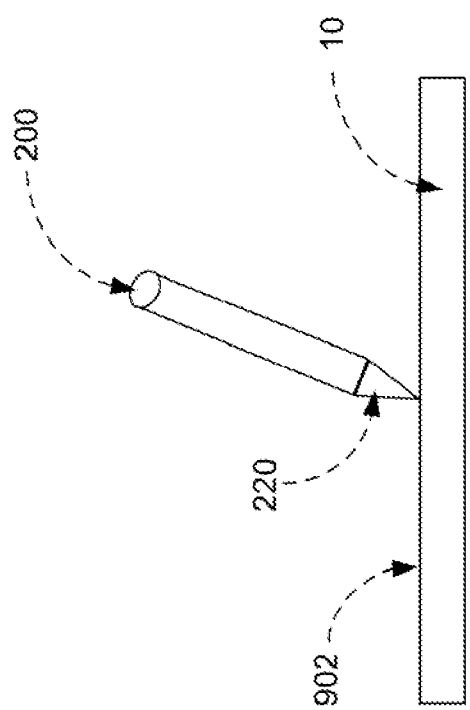

In particular embodiments, stylus controller 306 may include an IP core for transmitter 402. In the example of FIG. 4, transmitter 402 may receive the actual transmit voltage from IP core corresponding to adaptive voltage generation circuit 404 for transmitting signal 412. In particular embodiments, transmitter 402 may generate signal 412 based at least on the actual transmit voltage, a pre-determined frequency (e.g., frequency of oscillator 302), a pre-determined frame rate (e.g., frame rate of transmit scheme of signal 412), a pre-determined number of pulses within each frame of signal 412, or an output capacitive load $C_{Load}$ of transmitter 402 as seen by signal 412. Signal 412 may include one or more electrical signals. In particular embodiments, active stylus 200 may inject signal 412 into one or more conductive rings of tip 220 via center shaft 300, as discussed above. Furthermore, signal 412 may be received by a touch sensor (e.g., touch sensor 10) that is in contact with or within close proximity of tip 220 of active stylus 200. As an example and not by way of limitation, signal 412 may cause a voltage potential of tip 220 to alternate between GND voltage and the actual transmit voltage. The alternating voltage potentials of tip 220 may affect an amount of charge induced at one or more sense electrodes of the touch sensor. As such, the affected induced charges may cause changes in capacitance at the capacitive nodes of the touch sensor. Furthermore, a sense unit of a touch-sensor controller of the touch sensor may measure the changes in capacitance, as discussed above. The changes in capacitance may correspond to signal 412. In particular embodiments, when active stylus 200 is writing on a surface of touch sensor 10 (e.g., tip 220 of active stylus 200 is pressed against surface 902 of touch sensor 10 as illustrated by FIG. 9A), transmitter 402 may utilize one or more capacitors to transmit signal 412 until the capacitors are discharged to their minimum voltage levels. As an example and not by way of limitation, the discharge of the capacitors may include one or more low frequency discharges. Furthermore, such low frequency discharges may be filtered out by one or more high-pass filters at touch-sensor controller 12 of touch sensor 10. In particular embodiments, when active stylus 200 is hovering above a surface of touch sensor 10 (e.g., tip 220 of active stylus 200 is at a distance 904 above surface 902 of touch sensor 10 as illustrated by FIG. 9B), a voltage pump level of one or more DC voltage converters of adaptive voltage generation circuit 404 may increase. As such, the increase in the voltage pump level may enable transmitter 402 to transmit signal 412 at a higher voltage level substantially immediately in response to any increase in the hover distance. As an example and not by way of limitation, a pump rise time of one or more DC voltage converters at adaptive voltage generation circuit 404 may be less than approximately 2 ms. In particular embodiments, adaptive voltage generation circuit 404 may dynamically generate a pump voltage (e.g., actual transmit voltage) for transmitter 402 on a frame by frame basis in response to any change in hover distance of active stylus 200 from the surface of touch sensor 10. Although the disclosure describes or illustrates particular IP core corresponding to particular transmitter of particular active stylus transmitting particular signal at particular transmit voltage to particular touch sensor, the disclosure contemplates any suitable IP core of any suitable transmitter of any suitable active stylus transmitting any suitable signal at any suitable transmit voltage to any suitable touch sensor in any suitable manner.

In particular embodiments, power consumption of active stylus may depend on a type of the active stylus (e.g., whether the active stylus is a Tx-only active stylus or a Tx/Rx active stylus). As an example and not by way of limitation, a Tx/Rx active stylus hovering at a distance above a touch sensor (e.g., touch sensor 10) may adapt an actual transmit voltage based on a measured strength of one or more signals (e.g., signal 414) received from the touch sensor. In contrast, a Tx-only active stylus hovering at the same distance above the touch sensor may not be able to adapt the actual transmit voltage as it does not receive any signals from the touch sensor. Accordingly, the power consumption of the Tx/Rx active stylus may be better (i.e., lower) than the Tx-only active stylus while the active stylus hovers above the touch sensor. In particular embodiments, power consumption of the active stylus may depend on a usage pattern of the active stylus. As an example and not by way of limitation, power consumption of active stylus 200 in Active mode may depend on a percentage of time spent by active stylus 200 hovering (e.g., within close proximity of a surface of touch sensor 10) versus a percentage of time spent by the active stylus 200 writing on the surface of touch sensor 10. Active stylus 200 whose tip 220 is constantly in contact with the surface of touch sensor 10 (i.e., writing) may consume less power by transmitting at a lower actual transmit voltage, compare to a substantially equivalent active stylus 200 whose tip 220 hovers at a distance above the surface of touch sensor 10 (i.e., hovering). As an example and not by way of limitation, active stylus 200 having a usage pattern of 75% writing and 25% hovering may have lower power consumption than active stylus 200 having a usage pattern of 25% writing and 75% hovering. In particular embodiments, power consumption of active stylus 200 may depend on a transmit scheme (e.g., transmission payload) of signal 412. Herein, reference to a transmit scheme may encompass a transmission payload, or vice-versa, where appropriate. A transmit scheme may comprise a plurality of frames, where each frame comprises 32 transmit pulses of 16 bits data being repeated 4 times. In particular embodiments, one or more conductive rings of tip 220 may toggle between GND voltage and the actual transmit voltage based on $f_{Tx}$ (i.e., average frequency of signal 412). As $f_{Tx}$ increases, more energy may be expended by active stylus 200 to transmit signal 412. Accordingly, as the transmit scheme causes the conductive rings of tip 220 to toggle more over time, active stylus 200 may consume more power from power source 304. In particular embodiments, the transmission payload may vary based at least on an environmental electrical noise of active stylus 200 and touch sensor 10. As an example and not by way of limitation, the transmission payload may vary according to a signal-to-noise ratio (SNR) of signal 412. In particular embodiments, active stylus 200 may utilize substantially equivalent message protocols to communicate with touch sensor 10 while tip 220 of active stylus 200 is pressed against touch sensor 10 as illustrated by, for example FIG. 9A, and while active stylus 200 is hovering at a distance above touch sensor 10 as illustrated by, for example, FIG. 9B. As such, active stylus 200 should be able to transmit messages utilizing substantially equivalent transmit protocol regardless of whether tip 220 is pressed against or hovering above touch sensor 10. In particular embodiments, active stylus 200 may be operable to transmit at a higher actual transmit voltage while pressed against touch sensor 10 (e.g., writing on the surface of touch sensor 10 as illustrated by FIG. 9A) in order to achieve higher position accuracy and linearity at an expense of power consumption. In particular embodiments, the transmit scheme of signal 412 may depend on a vendor of touch-sensor controller 12 of touch sensor 10. Different vendors of touch-sensor controller 12 may have different requirements for signal 412. As an example and not by way of limitation, a first vendor may require signal 412 to be transmitted below a pre-determined actual transmit voltage (e.g., 6V) consistently. As another example and not by way of limitation, a second vendor may require signal 412 to be transmitted above a pre-determined actual transmit voltage (e.g., 18V) consistently. In particular embodiments, power consumption of active stylus 200 may depend on a transmitter load (e.g., output capacitive load $C_{Load}$) of transmitter 402 as seen by signal 412. As an example and not by way of limitation, as the transmitter load increases, more power may be consumed by transmitter 402 to transmit signal 412, as discussed above.

In particular embodiments, power consumption of an active stylus may depend on an operating mode of the active stylus. As an example and not by way of limitation, active stylus 200 may operate in three modes—Sleep, Idle, and Active. In Sleep mode, transmitter 402 of active stylus 200 may be turned off. As such, transmitter 402 may consume substantially minimal power in Sleep mode. In particular embodiments, receiver 410 may be turned off as well. In particular embodiments, active stylus 200 may operate in Sleep mode for a substantial period of time. In particular embodiments, active stylus 200 may enter the Sleep mode having not received a synchronization signal (e.g., signal 414) for pre-determined time duration. In particular embodiments, active stylus 200 may stay in Sleep mode until tip 220 is pressed against a surface. In particular embodiments, active stylus 200 may stay in Sleep mode until receiver 410 senses a signal (e.g., signal 414) from a touch sensor (e.g., touch sensor 10). In Idle mode, active stylus 200 may be constantly searching for a signal from a touch sensor in order to synchronize with a controller of the touch sensor. As an example and not by way of limitation, in Idle mode, active stylus 200 may be constantly searching for signal 414 from touch sensor 10 in order to synchronize with touch-sensor controller 12 of touch sensor 10. Active stylus 200 may enter Idle mode periodically while being used for writing. As an example and not by way of limitation, active stylus 200 may be lifted off a surface of touch sensor 10 (e.g., touch screen) while being used for writing. Accordingly, active stylus 200 may enter the Idle mode in response to being lifted off the surface. In particular embodiments, in Idle mode, transmitter 402 may be turned off while receiver 410 may remain operable to receive signals from touch sensor 10. In particular embodiments, adaptive voltage generation circuit 404 may periodically refresh one or more capacitors in order to be ready for sending signal 412 substantially immediately after active stylus 200 detects a controller of touch sensor (e.g., touch sensor 10). As an example and not by way of limitation, adaptive voltage generation circuit 404 may initially pre-charge the capacitors to a pre-determined voltage level (e.g., actual transmit voltage). In Active mode, active stylus 200 may hover at a distance above touch sensor 10 as illustrated by FIG. 9B, or may write on touch sensor 10 as illustrated by FIG. 9A. As an example and not by way of limitation, active stylus 200 may spend 25% of time hovering and 75% of time writing. In particular embodiments, active stylus 200 may transmit a substantial equivalent number of pulses to touch sensor (e.g., touch sensor 10) while hovering and while writing. In particular embodiments, during Active mode, receiver 410 may be turned on in one or more time slots when synchronization is expected to occur between active stylus 200 and a controller of touch sensor (e.g., touch-sensor controller 12 of touch sensor 10). As an example and not by way of limitation, receiver 410 may be turned on for a fixed time interval after active stylus 200 achieves lock with the controller. As another example and not by way of limitation, receiver 410 may be turned off while transmitter 402 is sending a signal (e.g., signal 412) to the touch sensor. In particular embodiments, during Active mode, transmitter 402 may be turned on fully after a completion of synchronization between active stylus 200 and the controller, or during a transmission of one or more signals (e.g., signal 412) to the touch sensor. Otherwise, transmitter 402 may be in a Tx-ready state where one or more capacitors of active stylus 200 are being refreshed by adaptive voltage generation circuit 404 as discussed above. In particular embodiments, adaptive control algorithm 406 may only be operable when active stylus 200 is in Active mode. As an example and not by way of limitation, active stylus 200 may adapt an actual transmit voltage of transmitter 402 only while active stylus 200 operates in Active mode. Although this disclosure describes particular dependencies of particular power consumption of particular active stylus, the disclosure contemplates any suitable dependencies of any suitable power consumption of any suitable active stylus in any suitable manner. Moreover, although this disclosure describes particular operating modes of particular active stylus, the disclosure contemplates any suitable operating modes of any suitable active stylus.

Figure 5:
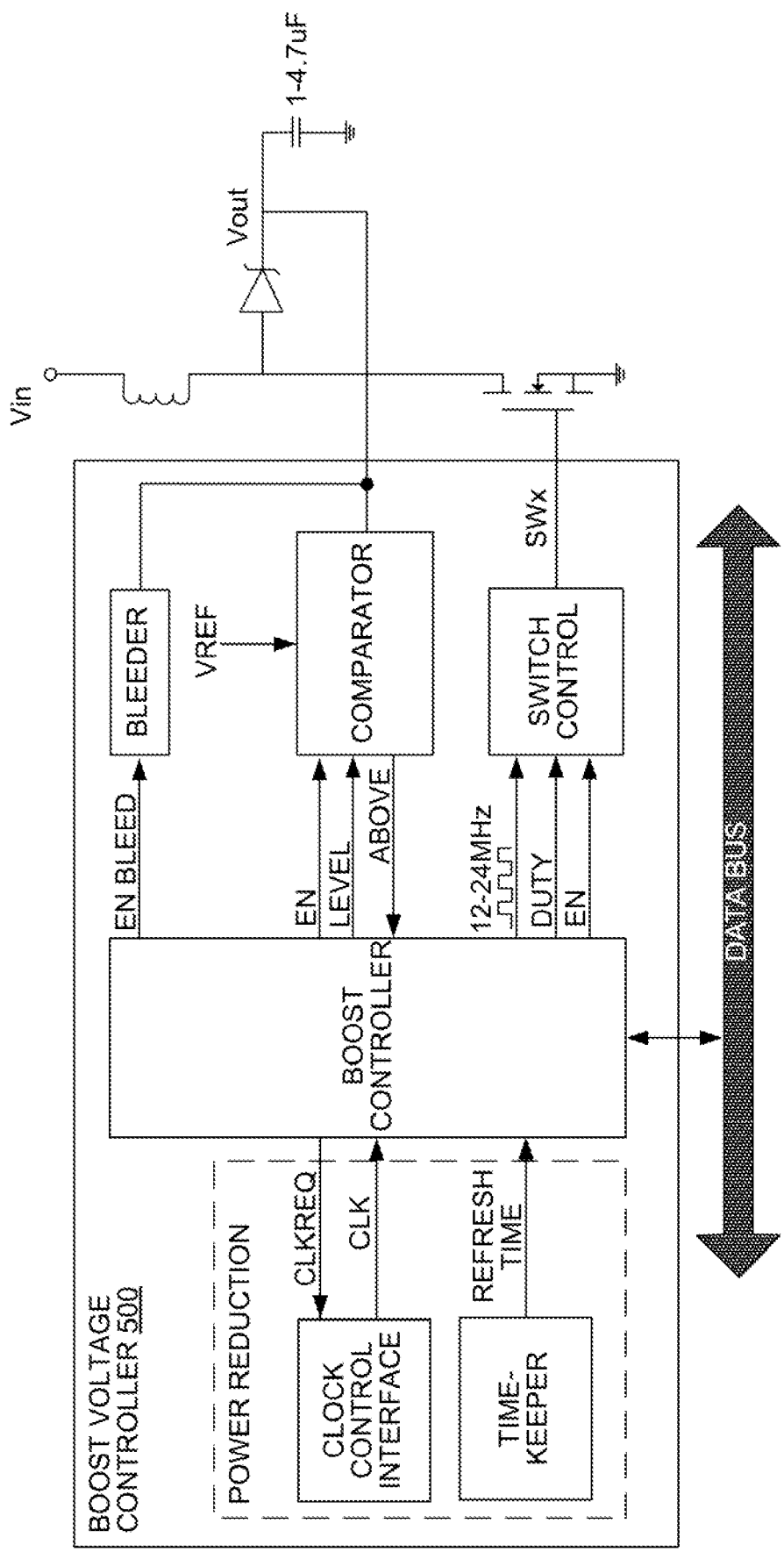
FIG. 5 illustrates an example boost voltage controller.

FIG. 5 illustrates boost voltage controller 500. In the example of FIG. 5, boost voltage controller 500 may generate output voltage (e.g., Vout of FIG. 5) at tip 220. Furthermore, the generated output voltage may include programmable voltage levels from approximately 5.5V to approximately 24V. Herein, reference to output voltage of boost voltage controller 500 may encompass Vout, or vice-versa, where appropriate. In particular embodiments, the generated output voltage may be programmable depending on whether a force is being applied to tip 220. If a force is being applied to tip 220, the generated output voltage may be programmed to be at a pre-determined voltage. As an example and not by way of limitation, if active stylus 200 is being utilized for writing, a force may be applied to tip 220. Accordingly, the generated output voltage at tip 220 may be programmed to be at a reduced voltage level. On the other hand, if no force is being applied to tip 220 of active stylus 200 (e.g., active stylus 200 hovers within proximity of a touch sensor), the generated output voltage may programmed based at least on a determined strength of an electrical signal received by a receiver of active stylus 200 from the touch sensor. In particular embodiments, the generated output voltage may be programmed by a firmware of stylus controller 306 of active stylus 200. In particular embodiments, boost voltage controller 500 may include bleeder circuit (or bleeder) to regulate down one or more voltages of stylus controller 306. As an example and not by way of limitation, the bleeder of boost voltage controller 500 may regulate down Vout from approximately 24V to approximately 6V in approximately 5 ms. As another example and not by way of limitation, the bleeder of boost voltage controller 500 may regulate down an operating voltage of stylus controller 306 such that stylus controller 306 may operate in a low-power state (e.g., Idle mode). In particular embodiments, boost voltage controller 500 may be operable by a slow start algorithm that avoids high in-rush currents during initial pump sequences. In addition, boost voltage controller 500 may be operable in an auto refresh mode for reduced current consumption. In particular embodiments, boost voltage controller 500 may include gate protection ensuring that boost voltage controller 500 is disabled whenever a GPIO pin of stylus controller 306 is pulled to GND. In particular embodiments, stylus controller 306 may utilize Vout of boost voltage controller 500 as an input to an ON/OFF switch for transmitting signal 412 from transmitter 402.

In the example of FIG. 5, boost voltage controller 500 may include a comparator that measures Vout. In particular embodiments, boost voltage controller 500 may utilize the comparator, together with the switch control, to shut off the boost when Vout is above a pre-determined threshold voltage level. In contrast, when Vout is below the pre-determined threshold voltage level, boost voltage controller 500 may enable the boost. Herein, reference to a boost of boost voltage controller 500 may encompass boost voltage controller 500 increasing (or stepping up) Vout, or vice-versa, where appropriate. In particular embodiments, boost controller of boost voltage controller 500 may send a signal (e.g., "Level" of FIG. 5) to the comparator for adjusting the pre-determined threshold voltage level based at least on a value of the signal. Although the disclosure describes and illustrates particular boost voltage controller for stylus controller 306 of active stylus 200, the disclosure contemplates any suitable DC voltage regulator for stylus controller 306 of active stylus 200 in any suitable manner. Furthermore, although the disclosure describes and illustrates particular boost voltage controller for generating particular output voltage at tip 220 of active stylus 200, the disclosure contemplates any suitable combination of one or more suitable voltage sources for generating any suitable output voltage at tip 220 of active stylus 200 in any suitable manner.

Figure 6:
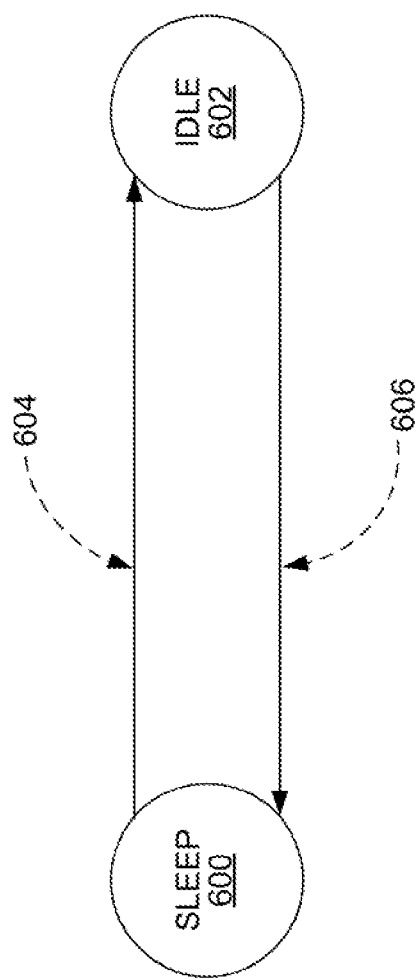
FIG. 6 illustrates an example state diagram for a controller of an active stylus.

FIG. 6 illustrates an example state diagram for stylus controller 306 of active stylus 200. In the example of FIG. 6, stylus controller 306 may operate between Sleep mode 600 and Idle mode 602. In Sleep mode 600, transmitter 402 and receiver 410 of stylus controller 306 may be turned off as discussed above. As such, touch-sensor controller 12 may not be searching for signals (e.g., signal 412) from active stylus 200. Active stylus 200 may also not be searching for signals (e.g., signal 414) from a touch sensor (e.g., touch sensor 10). Herein, reference to a touch sensor may encompass touch sensor 10, or vice-versa, where appropriate. In Idle mode 602, transmitter 402 may be turned off and receiver 410 of stylus controller 306 may remain operable to receive signals from touch sensor 10 as discussed above. In particular embodiments, in Idle mode 602, active stylus 200 has not established contact with touch sensor 10 even though active stylus 200 has previously established contact with touch sensor 10 (and subsequently lost contact with touch sensor 10). As such, active stylus 200 may be actively trying to re-establish contact with touch-sensor controller 12. Furthermore, edges 604 and 606 may represent transitions of stylus controller 306 between Sleep mode 600 and Idle mode 602 according to a wake-up timer (WUT) of stylus controller 306. In particular embodiments, the WUT may be operable based on a programmable time keeper. The programmable time keeper may include one or more timing intervals (e.g., from approximately 64 μs to approximately 8.192 ms) for stylus controller 306 to enter Idle mode 602 from Sleep mode 600, and to enter Sleep mode 600 from Idle mode 602, upon the expiration of the appropriate timing intervals. As an example and not by way of limitation, stylus controller 306 may enter Idle mode 602 from Sleep mode 600 after a first pre-determined timing interval (i.e., transition condition for edge 604). As another example and not by way of limitation, stylus controller 306 may enter Sleep mode 600 from Idle mode 602 after a second pre-determined timing interval (i.e., transition condition for edge 606). Although the disclosure describes and illustrates particular state diagram for stylus controller 306 operating between particular Sleep mode and particular Idle mode including particular edges and particular transition conditions of FIG. 6, the disclosure contemplates any suitable state diagram for stylus controller 306 operating between any suitable Sleep mode and any suitable Idle mode including any suitable combination of one or more of any suitable edge and any suitable transition condition in any suitable manner. Although the disclosure describes and illustrates particular transitions between particular modes of stylus controller 306 according to particular wake-up timer of stylus controller 306, the disclosure contemplates any suitable transitions between any suitable modes of stylus controller 306 according to any suitable wake-up detection sensor of stylus controller 306.

Figure 7:
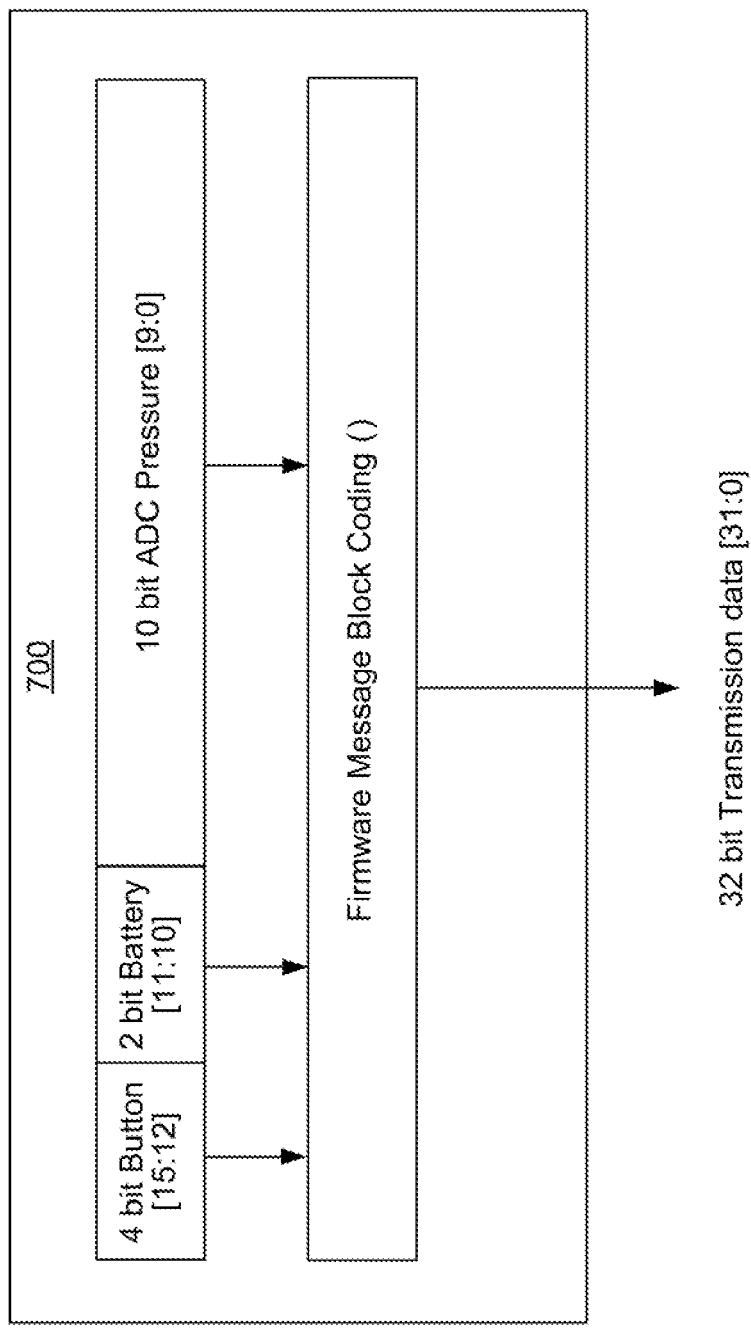
FIG. 7 illustrates an example transmission payload for a controller of an active stylus.

FIG. 7 illustrates transmission payload 700 for stylus controller 306 of active stylus 200. In particular embodiments, transmission payload 700 may be included in signal 412 as transmitted by transmitter 402. In the example of FIG. 7, transmission payload 700 may be transmitted from stylus controller 306 to touch-sensor controller 12 of touch sensor 10 when stylus controller 306 is synchronized with touch-sensor controller 12. In particular embodiments, transmission payload 700 may include a 16 bit data package comprising a 4 bit data [15:12] for button information, a 2 bit data [11:10] for battery information, and a 10 bit data [9:0] for ADC pressure information. The 16 bit data package may enable active stylus 200 to send tip pressures, button clicks, and battery health information to touch-sensor controller 12 of touch sensor 10. In addition, transmission payload 700 may include one or more bits as header (not shown in FIG. 7). The header bits may be used to set up communication between active stylus 200 and touch sensor 10, and does not include any data (e.g., tip pressure, battery health, and button information as discussed above). In particular embodiments, stylus controller 306 may send up to 64 bits to touch sensor 10 per drive pulse train for each drive electrode line at every drive transmit frame. Stylus controller 306 may also be operable to adjust the number of header bits versus data bits and/or layout of transmission payload 700. As an example and not by way of example, the 16 bit data package (i.e., 16 data bits) may be repeated 4 times in 8 ms and sent as 64 individual data bits per drive pulse train. As another example and not by way of limitation, firmware message block coding( ) may add 16 bits of cyclic redundancy check (CRC) checksum to the 16 bit data package before sending the 16 bit data package as a 32 bit transmission data for each drive pulse train at every drive transmit frame. The 16 bits of CRC checksum may depend on a pre-determined coding utilized by stylus controller 306. As an example and not by way of limitation, stylus controller 306 may utilize Manchester Coding to generate the 16 bits CRC checksum for each 16 bit data package. In particular embodiments, the firmware message block coding( ) may include one or more block codes allowing stylus controller 306 and/or touch-sensor controller 12 to decode transmission payload 700 (e.g., data package of transmission payload 700) with a pre-determined algorithm. In particular embodiments, the adjustment of header bits versus data bits in transmission payload 700 and/or layout of transmission payload 700 may depend on a SNR of signal 412. In particular embodiments, the 16 bit data package of transmission payload 700 may be extended to include additional data bits for further identification of active stylus 200 and one or more functionalities (e.g., write or read) of active stylus 200. In particular embodiments, an actual transmit voltage of signal 412 may decrease as transmission payload 700 increases. Although this disclosure describes and illustrates particular transmission payload for stylus controller 306 of active stylus 200, the disclosure contemplates any suitable transmission payload for any suitable stylus controller of any suitable active stylus in any suitable manner.

Figure 8:
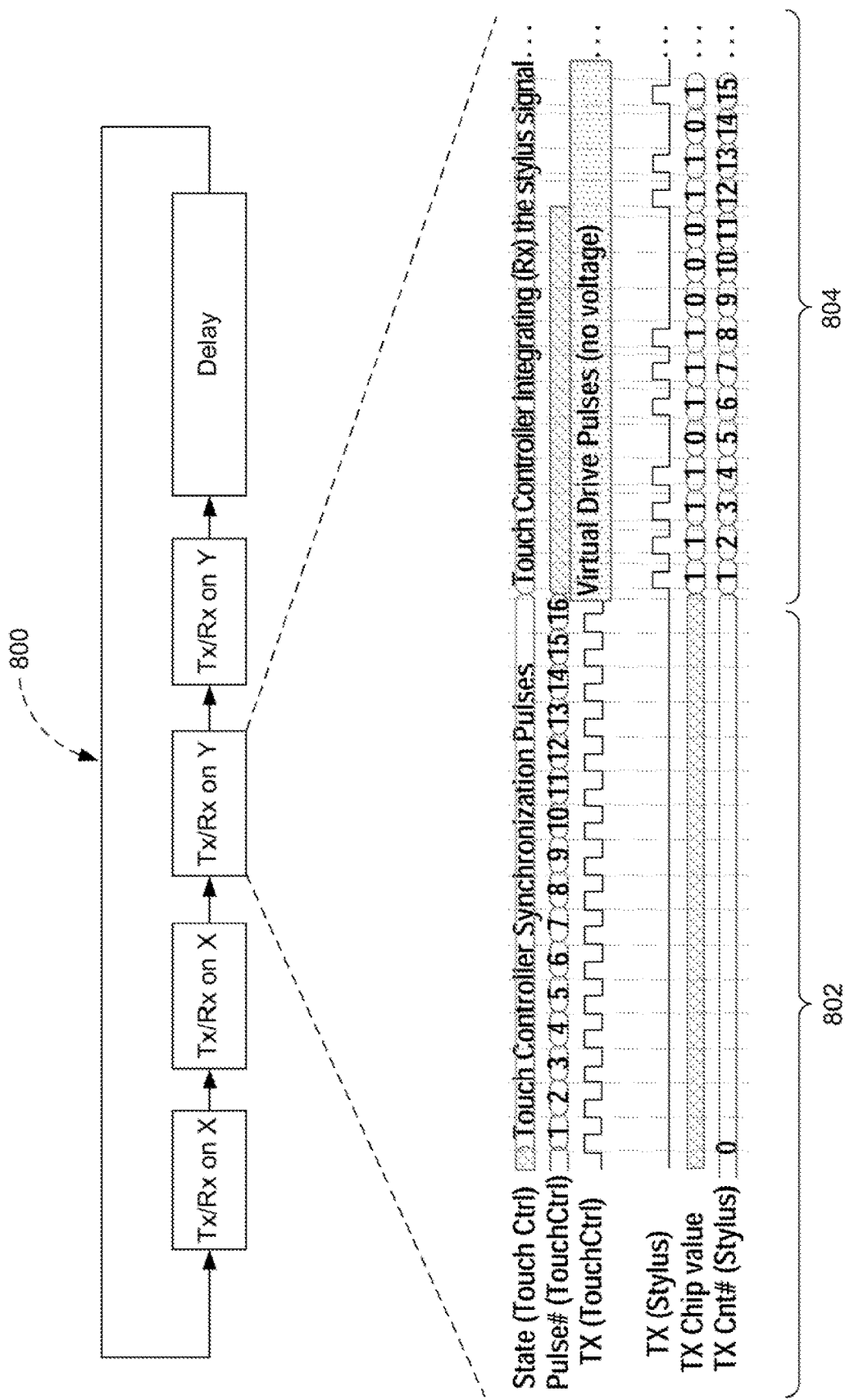
FIG. 8 illustrates an example timing diagram for communication between a stylus controller and a touch-sensor controller during an example Active mode of the stylus controller.

FIG. 8 illustrates an example timing diagram for communication between stylus controller 306 and touch-sensor controller 12 during an example Active mode of stylus controller 306. In the example of FIG. 8, timing loop 800 may be associated with a drive transmit frame whose duration is approximately equivalent to 8 ms. In particular embodiments, a duration of timing loop 800 may depend at least in part on a frame rate (e.g., approximately 60 Hz to 200 Hz) of signal 412. In particular embodiments, touch-sensor controller 12 may also transmit information associated with tip 220 (e.g., pressure of tip 220 against touch-sensor 10), one or more buttons 206 (e.g., pressing of buttons 206), and/or active stylus 200 (e.g., proximity position of active stylus 200) to an operating system of touch-sensor 10 at the frame rate. Furthermore, timing loop 800 may include two consecutive transmit/receive (Tx/Rx) transmission sequences on one or more drive electrode lines (e.g., Tx/Rx on X), followed by two consecutive Tx/Rx transmission sequences on one or more sense electrode lines (e.g., Tx/Rx on Y), followed by a delay phase (e.g., Delay in FIG. 8). In particular embodiments, the delay phase may indicate an end of communication between touch-sensor 10 and active stylus 200, and/or a start of the next Tx/Rx transmission sequence. In the example of FIG. 8, a Tx/Rx transmission sequence on a sense electrode line may include synchronization timing interval 802 and integration timing interval 804. During synchronization timing interval 802 of 16 transmit pulses, touch-sensor controller 12 may synchronize with stylus controller 306. In particular embodiments, such synchronization timing interval may be associated with touch-sensor controller 12 achieving a timing lock with stylus controller 306. As an example and not by way of limitation, touch-sensor controller 12 may drive touch sensor 10 allowing active stylus 200 to see the Tx/Rx transmission sequence of synchronization timing interval 802 and thereafter lock to touch-sensor controller 12 based at least on the Tx/Rx transmission sequence of synchronization timing interval 802. During integration timing interval 804, stylus controller 306 may transmit signal 412 to active stylus 200 via tip 220. As an example and not by way of limitation, after achieving frequency and/or phase lock with touch-sensor controller 12 based at least on the Tx/Rx transmission sequence of synchronization timing interval 802, active stylus 200 may transmit a response (e.g., signal 412) to touch-sensor controller 12. In particular embodiments, signal 412 may alter (e.g., add and/or remove) charge on the drive pulse train as received from touch-sensor controller 12 via touch sensor 10. At approximately the same time, touch-sensor controller 12 may integrate the sense signals as received on one or more sense electrode lines to detect and retrieve signal 412 transmitted by transmitter 402 of stylus controller 402. As such, in order to reduce power consumption of active stylus 200, stylus controller 306 may enable receiver 410 during synchronization timing interval 802 of timing loop 800 and disable receiver 410 during delay phase (i.e., Delay in FIG. 8) and during integration timing interval 804 of timing loop 800. Furthermore, stylus controller 306 may enable transmitter 402 for transmitting signal 412 to active stylus 200 during integration timing interval 804 of timing loop 800. Although this disclosure describes and illustrates particular Tx/Rx transmission sequence on particular sense electrode line including synchronization timing interval 802 and integration timing interval 804, the disclosure contemplates any suitable Tx/Rx transmission on any suitable drive electrode line including synchronization timing interval 802 and integration timing interval 804 in any suitable manner.

In particular embodiments, depending on touch-sensor 10, timing loop 800 may include substantially identical Tx/Rx transmission being repeated a pre-determined number of times. Herein, reference to a Tx/Rx transmission may encompass a scan, or vice-versa, where appropriate. As an example and not by way of limitation, touch-sensor 10 may include a pre-determined number of drive electrode lines (or X-arrays) and a pre-determined number of sense electrode lines (or Y-arrays). In order for touch-sensor controller 12 to sense and synchronize the entire X- and Y-arrays, each identical scan may be repeated. As an example and not by way of limitation, touch-sensor 10 may include two X-arrays and two Y-arrays. Accordingly, touch-sensor controller 12 may repeat each identical scan four times in order to sense the two X-arrays and two Y-arrays of touch-sensor 10. Although this disclosure describes and illustrates particular timing diagrams for particular communication between stylus controller 306 and touch-sensor controller 12 during particular Active mode of stylus controller 306, the disclosure contemplates any suitable combinations of one or more suitable timing diagrams for any suitable communication between any suitable stylus controller and any suitable touch-sensor controller during any suitable Active mode of the stylus controller in any suitable manner. Moreover, although this disclosure describes and illustrates stylus controller 306 enabling and disabling transmitter 402 and receiver 410 during particular communication between stylus controller 306 and touch-sensor controller 12 in order to reduce power consumption of stylus controller 306, the disclosure contemplates any suitable stylus controller enabling and disabling any suitable transmitter and any suitable receiver during any suitable communication between the stylus controller and any suitable touch-sensor controller in any suitable manner in order to reduce power consumption of the stylus controller.

FIGS. 9A-9B illustrate active stylus 200 with touch sensor 10. Active stylus 200 may interact or communicate with touch sensor 10 when it is brought in contact with or in proximity to touch sensor 10 (e.g., surface 902 of touch sensor 10). Surface 902 may include a surface of a cover panel of touch sensor 10, as discussed above. In particular embodiments, surface 902 may include one or more touch-sensitive areas of touch sensor 10. In the example of FIG. 9A, tip 220 of active stylus 200 may be in contact with surface 902 of touch sensor 10. In contrast, in the example of FIG. 9B, tip 220 may be hovering at a distance 904 above surface 902 of touch sensor 10. In particular embodiments, tip 220 may hover above surface 902 at a minimum hover distance 904 of 5 mm. Interaction between active stylus 200 and touch sensor 10 may be capacitive, inductive, or conductive. When active stylus 200 is bought in contact with or in the proximity of touch sensor 10, signals (e.g., signal 414) generated by active stylus 200 may influence capacitive nodes within one or more touch-sensitive areas of touch sensor 10. As an example and not by way of limitation, the generated signals by active stylus 200 may set up one or more electric fields at the touch-sensitive areas of touch sensor 10. By integrating a current (e.g., an alternating current) associated with the electric fields, a controller (e.g., touch-sensor controller 12) of touch sensor 10 may interact with active stylus 200. Furthermore, the interaction between active stylus 200 and the controller of touch sensor 10 may occur when active stylus 200 is contacting with or in proximity to touch sensor 10. As an example and not by way of limitation, referencing FIG. 9A, a user of active stylus 200 may write one or more characters on surface 902 of touch sensor 10. Based on the actions of the user, active stylus 200 may interact with a controller of touch sensor 10 to register the written characters of the user. A computing device of the touch sensor 10 may even authenticate the written characters before storing them in a memory of the computing device. As an example and not by way of limitation, referencing FIG. 9B, a user of active stylus 200 may perform a gesture or sequence of gestures, such as pressing one or more buttons 206 whilst active stylus 200 is hovering above surface 902 of touch sensor 10. Based on the one or more buttons 206 being pressed, active stylus 200 may interact with a controller (e.g., touch-sensor controller 12) of touch sensor 10 to initiate a pre-determined function of a computing device of touch sensor 10. The pre-determined function may authenticate a user associated with active stylus 200 or the computing device. The pre-determined function may even initiate a particular job function of the computing device. Although this disclosure describes or illustrates particular interactions between particular active stylus and particular touch sensor 10 in a particular manner, this disclosure contemplates any suitable interactions between any suitable active stylus and any suitable touch sensor in any suitable manner, In particular embodiments, the electric fields between tip 220 of active stylus 200 and touch sensor 10 may substantially weaken as distance 904 between tip 220 and surface 902 of touch sensor 10 increases. Furthermore, if a strength of the electric fields falls below a threshold, active stylus 200 may lose communication with a controller of touch sensor 10. As an example and not by way of limitation, for active stylus 200 having a fixed actual transmit voltage, a maximum hover distance 904 at which active stylus 200 could hover above surface 902 of touch sensor 10 without losing communication with touch-sensor controller 12 of touch sensor 10 is 20 mm. In particular embodiments, increasing the actual transmit voltage of active stylus 200 (as discussed above) may compensate for the weakening electric fields as hover distance 904 increases. Furthermore, the actual transmit voltage of active stylus 200 whilst hovering above surface 902 of touch sensor 10 may be higher than the actual transmit voltage of active stylus 200 whilst in contact with touch sensor 10. As such, while active stylus 200 is in contact with touch sensor 10, the actual transmit voltage of active stylus 200 may not be as high as that of active stylus 200 whilst hovering above touch sensor 10. In particular embodiments, reducing the actual transmit voltage while active stylus 200 is in contact with touch sensor 10 may reduce a power consumption of active stylus 200, as discussed above. In particular embodiments, increasing the actual transmit voltage while active stylus 200 is hovering above touch sensor 10 may improve a SNR of signal 412 of active stylus 200, as discussed above.

Figure 10:
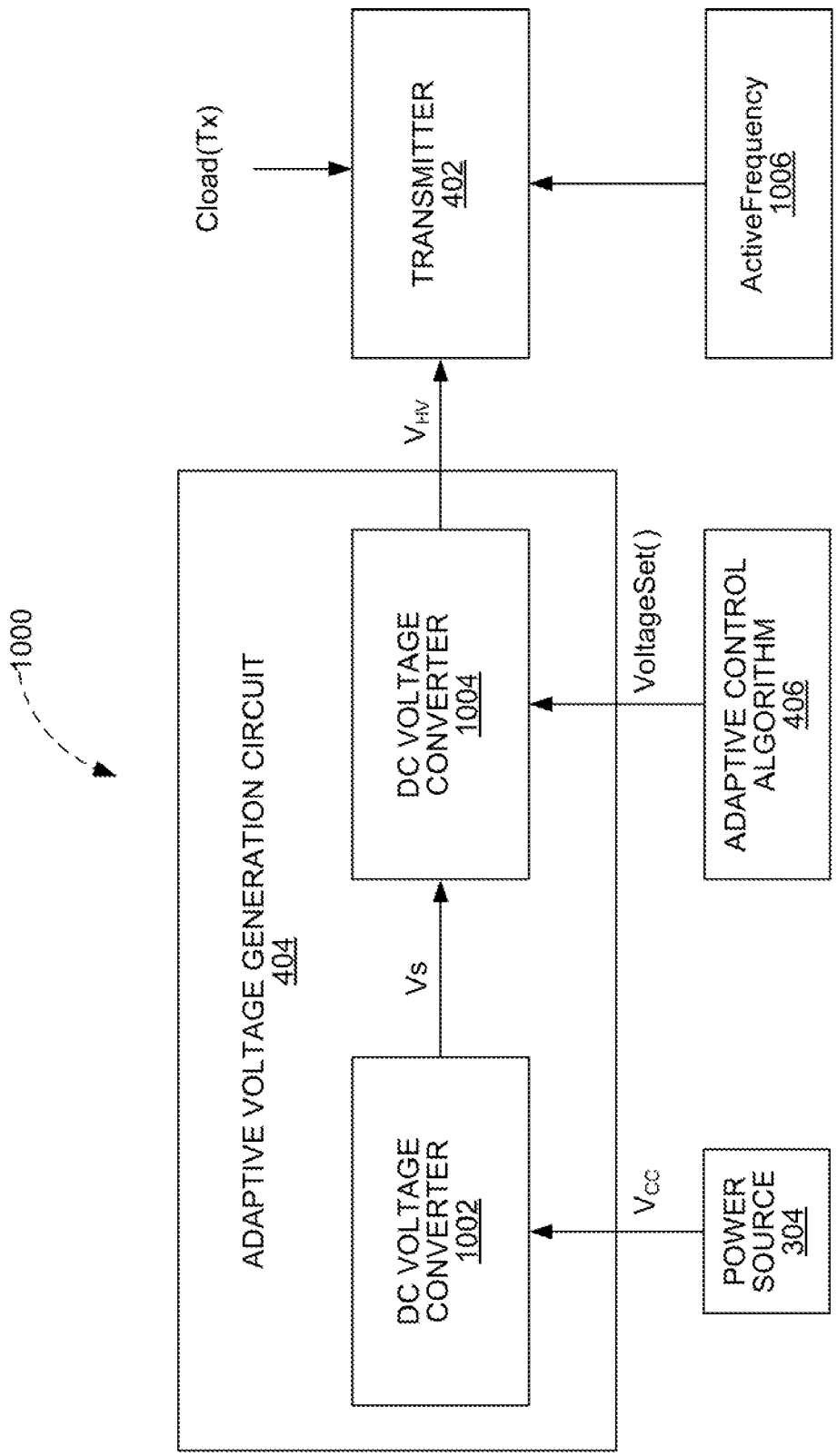
FIG. 10 illustrates an example mathematical model for generating relationships between current draw of a power source of an active stylus and actual transmit voltage of the active stylus based on output capacitive loads of the active stylus.

FIG. 10 illustrates mathematical model 1000 for generating relationships between current draw of power source 304 of active stylus 200 and actual transmit voltage of active stylus 200 based on output capacitive loads of active stylus 200. In particular embodiments, mathematical model 1000 may be utilized for determining an expected power reduction of active stylus 200 versus an output capacitive load, a transmission payload (e.g., transmission payload 700), and/or actual transmit voltage of active stylus 200. In the example of FIG. 10 and further referencing FIG. 4, adaptive voltage generation circuit 404 may include mathematical models for DC voltage converter 1002 and DC voltage converter 1004 for generating the actual transmit voltage of active stylus 200. In particular embodiments, a mathematical model for DC voltage converter 1002 may determine a relationship between current draw of power source 304 (i.e., $I_{VCC}$) and power consumption of DC voltage converter 1002 (i.e., $P_{1002}$) based at least on a voltage of power source 304 (i.e., $V_{CC}$) and an efficiency of DC voltage converter 1002 (i.e., efficiency($P_{1002}$)). As an example and not by way of limitation, $$I_{VCC} = \frac{1}{V_{CC}} \times \frac{P_{1002}}{\text{efficiency}(P_{1002})}.$$

In particular embodiments, a mathematical model for transmitter 402 may determine a relationship between power consumption of transmitter 402 (i.e., $P_{TX}$) and the actual transmit voltage (i.e., $V_{HV}$) generated by DC voltage converter 1004 based at least on a frequency of signal 412 (i.e., ActiveFrequency 1006) and output capacitive load of transmitter 402 as seen by signal 412 (i.e., $C_{load(TX)}$). As an example and not by way of limitation, $P_{TX}=V_{HV}^2 \times$ActiveFrequency 1006$\times C_{load(TX)}$. In particular embodiments, referencing transmission payload 700 of FIG. 7, ActiveFrequency 1006 may be further determined based at least on a frame rate of signal 412, a number of transmit pulses for transmission payload 700, a number of times 16 bit data package is repeated within transmission payload 700, or any suitable combinations thereof. Furthermore, power consumption of transmitter 402 may be substantially equivalent to power consumption of DC voltage converter 1004 (i.e., $P_{1004}$). In particular embodiments, a mathematical model for DC voltage converter 1004 may determine a relationship between $P_{1002}$ and $P_{1004}$ based at least on an efficiency of DC voltage converter 1004 (i.e., efficiency($P_{1004}$)). As an example and not by way of limitation, $P_{TX}=P_{1004}=P_{1002}\times$efficiency($P_{1004}$). Furthermore, DC voltage converter 1004 may determine a value of actual transmit voltage $V_{HV}$ based at least on an instructed voltage (i.e., VoltageSet( )) generated by adaptive control algorithm 406 as discussed above. Although this disclosure describes and illustrates particular mathematical models for generating particular relationships between particular current draw of power source 304 and particular actual transmit voltage of active stylus 200 based on particular output capacitive loads of active stylus 200, the disclosure contemplates any suitable combination of one or more of any suitable mathematical model for generating any suitable relationships between any suitable current draw of any suitable power source and any suitable actual transmit voltage of any suitable active stylus based on any suitable output capacitive loads of the suitable active stylus in any suitable manner.

Figure 11A:
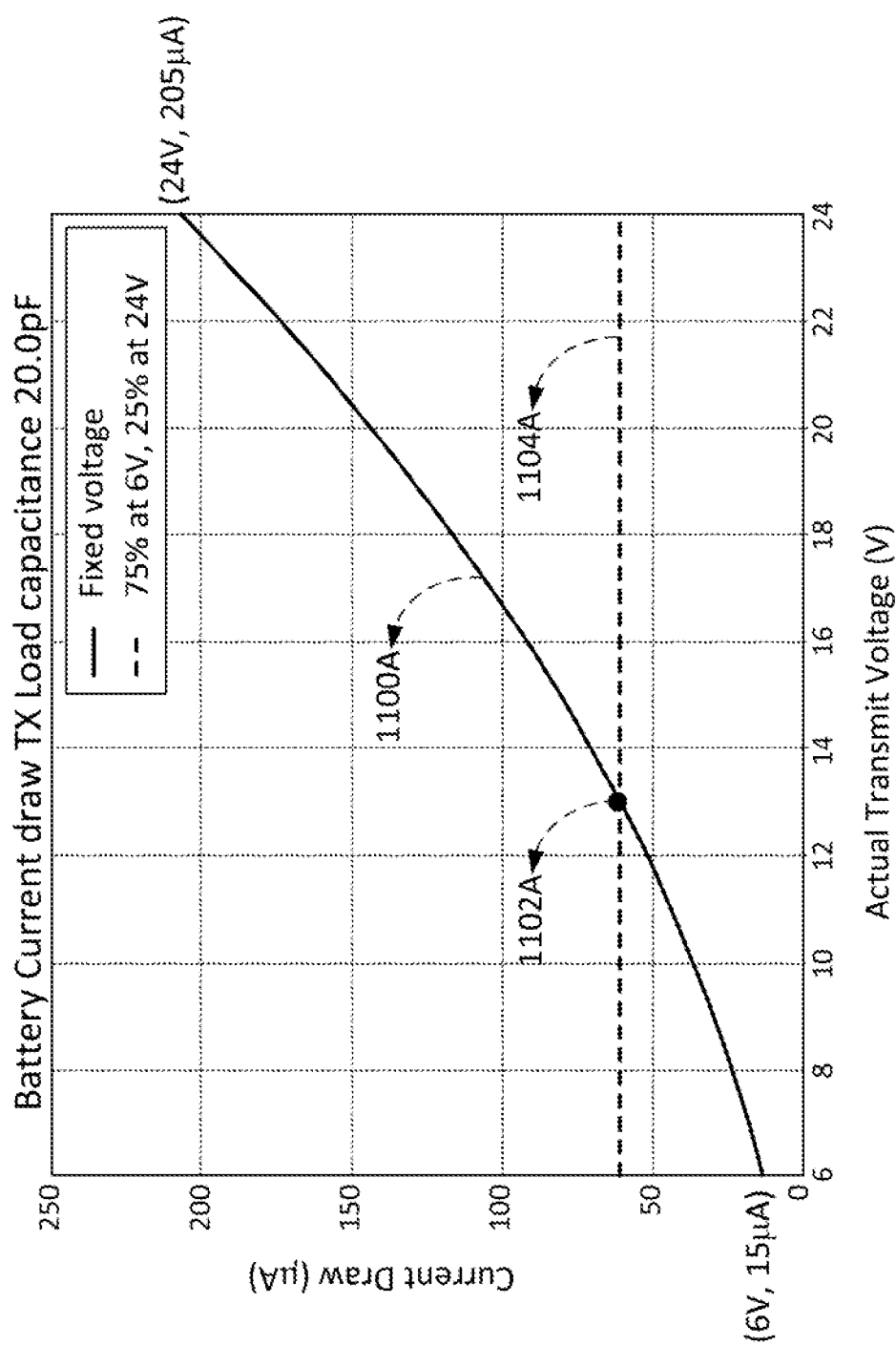
FIGS. 11A-11D illustrate example relationships between current draw of a power source of an active stylus and actual transmit voltage of the active stylus based on example output capacitive loads of the active stylus.
Figure 11B:
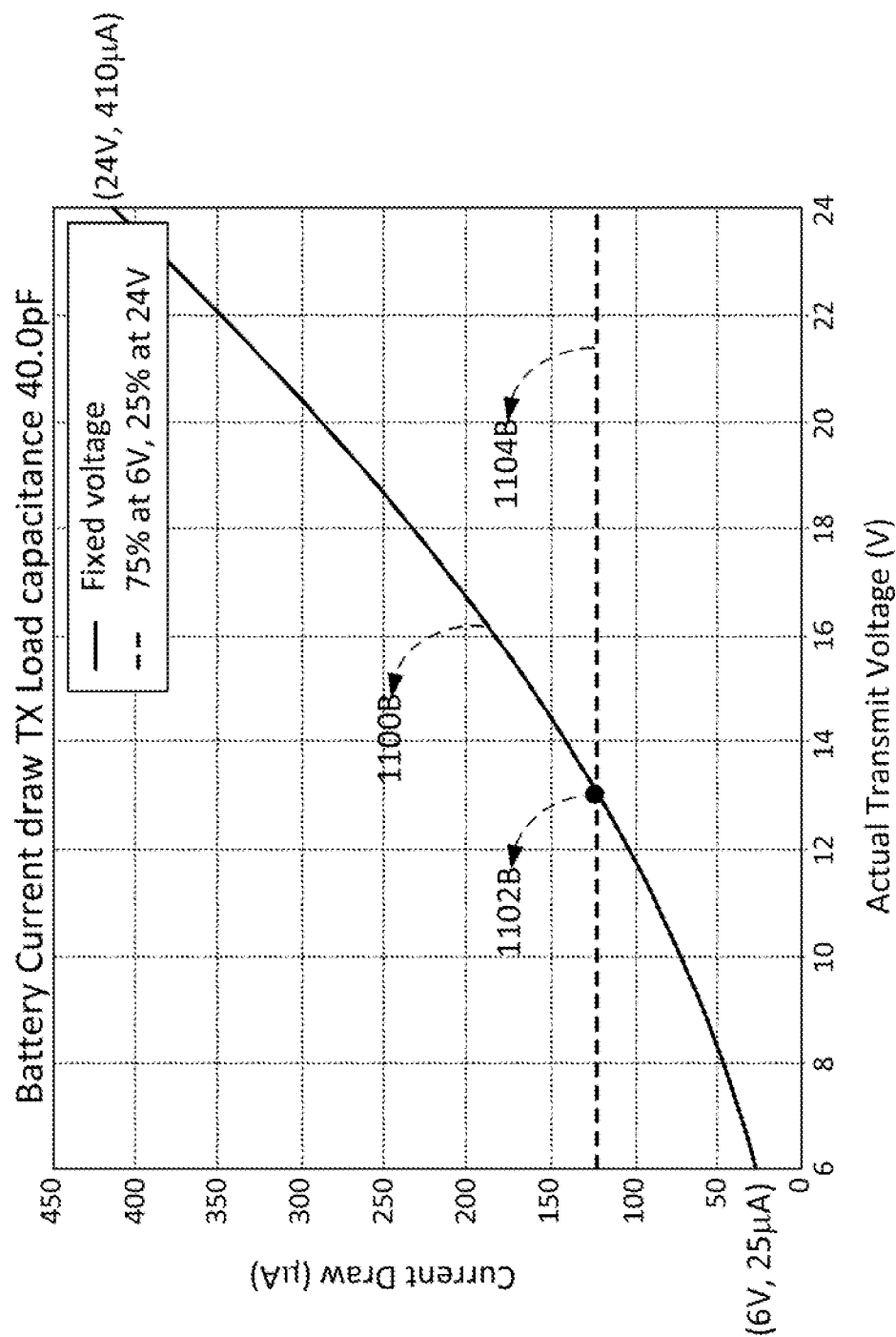
Figure 11C:
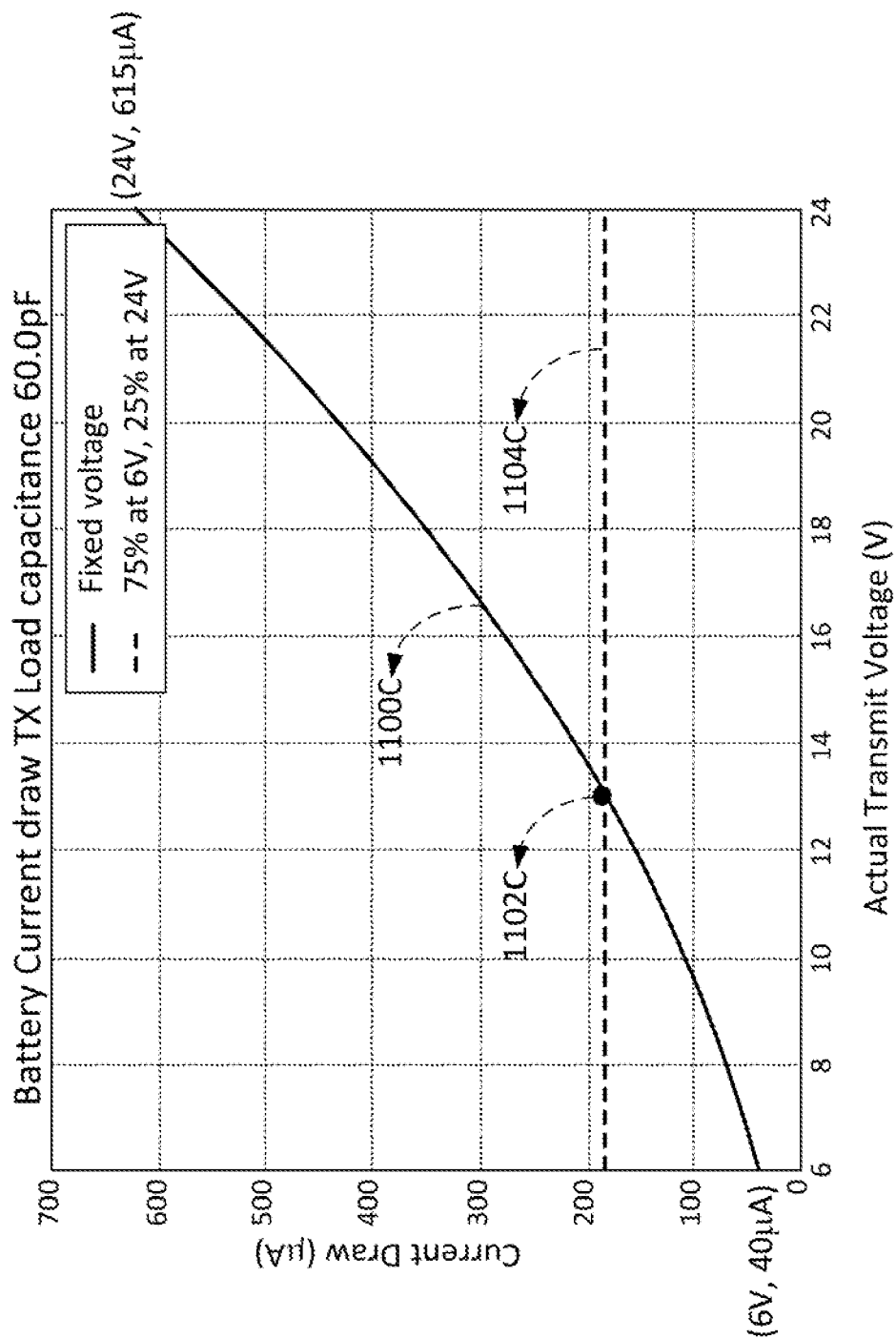
Figure 11D:
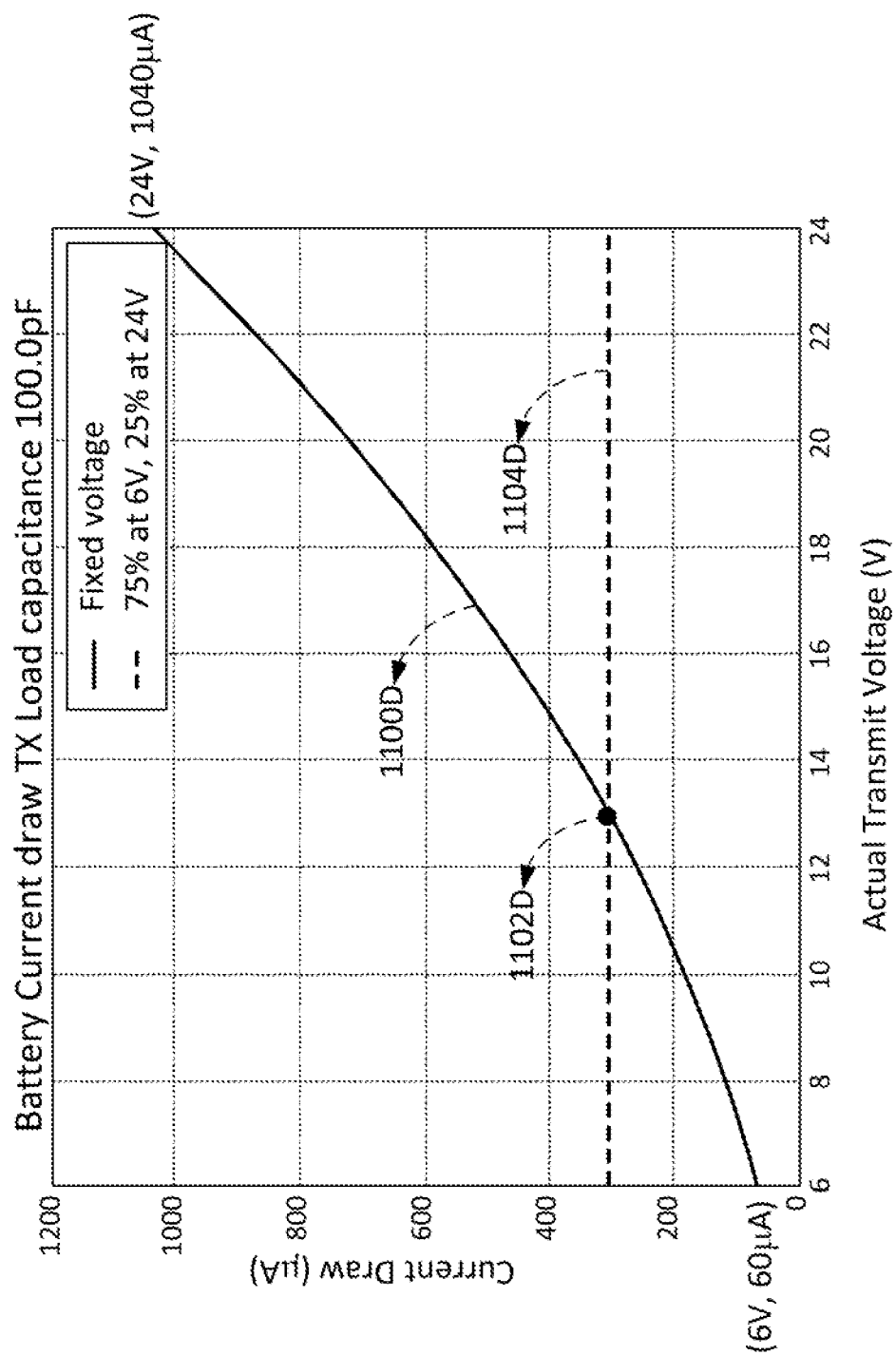

FIGS. 11A-11D illustrate relationships 1100A-1100D between current draw of power source 304 of active stylus 200 and actual transmit voltage of active stylus 200 based on example output capacitive loads of active stylus 200. In the examples of FIGS. 11A-11D, power source 304 may be a 1.5V alkaline battery and the current draw may correspond to a DC current consumption of the 1.5V alkaline battery by active stylus 200. Furthermore, the actual transmit voltage may correspond to a voltage of signal 412 transmitted by transmitter 402. In particular embodiments, relationships 1100A-1100D of FIGS. 11A-11D may be determined based at least on one or more mathematical models as illustrated and described by FIG. 10. As an example and not by way of limitation, the current draw of power source 304 may correspond to $I_{VCC}$ and the actual transmit voltage of active stylus 200 may correspond to $V_{HV}$. In the example of FIGS. 11A-11D and further referencing FIG. 10, DC voltage converter 1002 may have an efficiency of 85% (i.e., efficiency($P_{1002}$)=85%) and DC voltage converter 1004 may have an efficiency of 80% (i.e., efficiency($P_{1004}$)=80%). Furthermore, $V_{HV}$ may be programmable and determined based on VoltageSet( ) generated by adaptive control algorithm 406 as discussed above. In the examples of FIGS. 11A-11D, output capacitive load (i.e., $C_{load(TX)}$) of transmitter 402 as seen by signal 412 may be adjusted from 20 pF to 100 pF. In particular embodiments, the output capacitive load may depend at least on a construction of active stylus 200. As an example and not by way of limitation, the construction of active stylus 200 may include construction (e.g., mechanical, material, and/or size) of tip 220 and a printed circuit board (PCB) of transmitter 402. In particular embodiments, it may be desirable for stylus controller 306 to utilize one or more dynamic adaptive voltage schemes as the output capacitive load increases. Furthermore, transmitter 402 may be transmitting signal 412 with a new frame every 8 ms, where each new frame comprises 128 transmit pulses. In the example of FIG. 11A, $C_{load(TX)}$ of transmitter 402 may be 20 pF. As an example and not by way of limitation, referencing relationship 1100A, as actual transmit voltage of active stylus 200 increases from 6V to 24V, current draw of the 1.5V alkaline battery may increase from 15 µA to 205 µA. In the example of FIG. 11B, $C_{load(TX)}$ of transmitter 402 increases to 40 pF. As an example and not by way of limitation, referencing relationship 1100B, as actual transmit voltage of active stylus 200 increases from 6V to 24V, current draw of the 1.5V alkaline battery may increase from 25 µA to 410 µA. In the example of FIG. 11C, $C_{load(TX)}$ of transmitter 402 further increases to 60 pF. As an example and not by way of limitation, referencing relationship 1100C, as actual transmit voltage of active stylus 200 increases from 6V to 24V, current draw of the 1.5V alkaline battery may increase from 40 μA to 615 μA. In the example of FIG. 11D, $C_{load(TX)}$ of transmitter 402 further increases to 100 pF. As an example and not by way of limitation, referencing relationship 1100D, as actual transmit voltage of active stylus 200 increases from 6V to 24V, current draw of the 1.5V alkaline battery may increase from 60 μA to 1040 μA. As such, based on the examples of FIGS. 11A-11D, as the output capacitive load (i.e., $C_{load(TX)}$) of transmitter 402 increases, current draw by active stylus 200 may increase. In particular embodiments, instead of varying the actual transmit voltage of signal 412 from 6V to 24V (i.e., first adaptive voltage scheme), stylus controller 306 of active stylus 200 may transmit signal 412 at only two actual transmit voltages (i.e., second adaptive voltage scheme). As an example and not by way of limitation, stylus controller 306 may transmit signal 412 at 24V while active stylus 200 is hovering (at any distances) above touch sensor 10 and at 6V while active stylus 200 is writing on a surface (e.g., surface 902) of touch sensor 10. In particular embodiments, active stylus 200 may spend 75% of time writing and 25% of time hovering. Accordingly, referencing FIGS. 11A-11D, lines 1104A-1104D illustrate example current draws of active stylus 200 when active stylus 200 spends 75% of time writing and 25% of time hovering. Furthermore, lines 1104A-1104D illustrate example current draws of active stylus 200 for various output capacitive loads (i.e., 20 pF, 40 pF, 60 pF, and 100 pF respectively) of active stylus 200. As an example and not by way of limitation, based at least on lines 1104A-1104D of FIGS. 11A-11D, current draw of active stylus 200 may be proportional to output capacitive load of active stylus 200. Accordingly, referencing current draws 1102A-1102D of FIGS. 11A-11D, at an actual transmit voltage of 13V, the current draws of the 1.5V alkaline battery by active stylus 200 may be substantially equivalent between the first adaptive voltage scheme and second adaptive voltage scheme at 13V. Although this disclosure describes or illustrates particular relationships between particular current draw of particular power source of active stylus 200 and particular transmit voltage of active stylus 200, the disclosure contemplates any suitable relationships between any suitable current draw of any suitable power source of any suitable active stylus and any suitable transmit voltage of the active stylus in any suitable manner.

Figure 12:
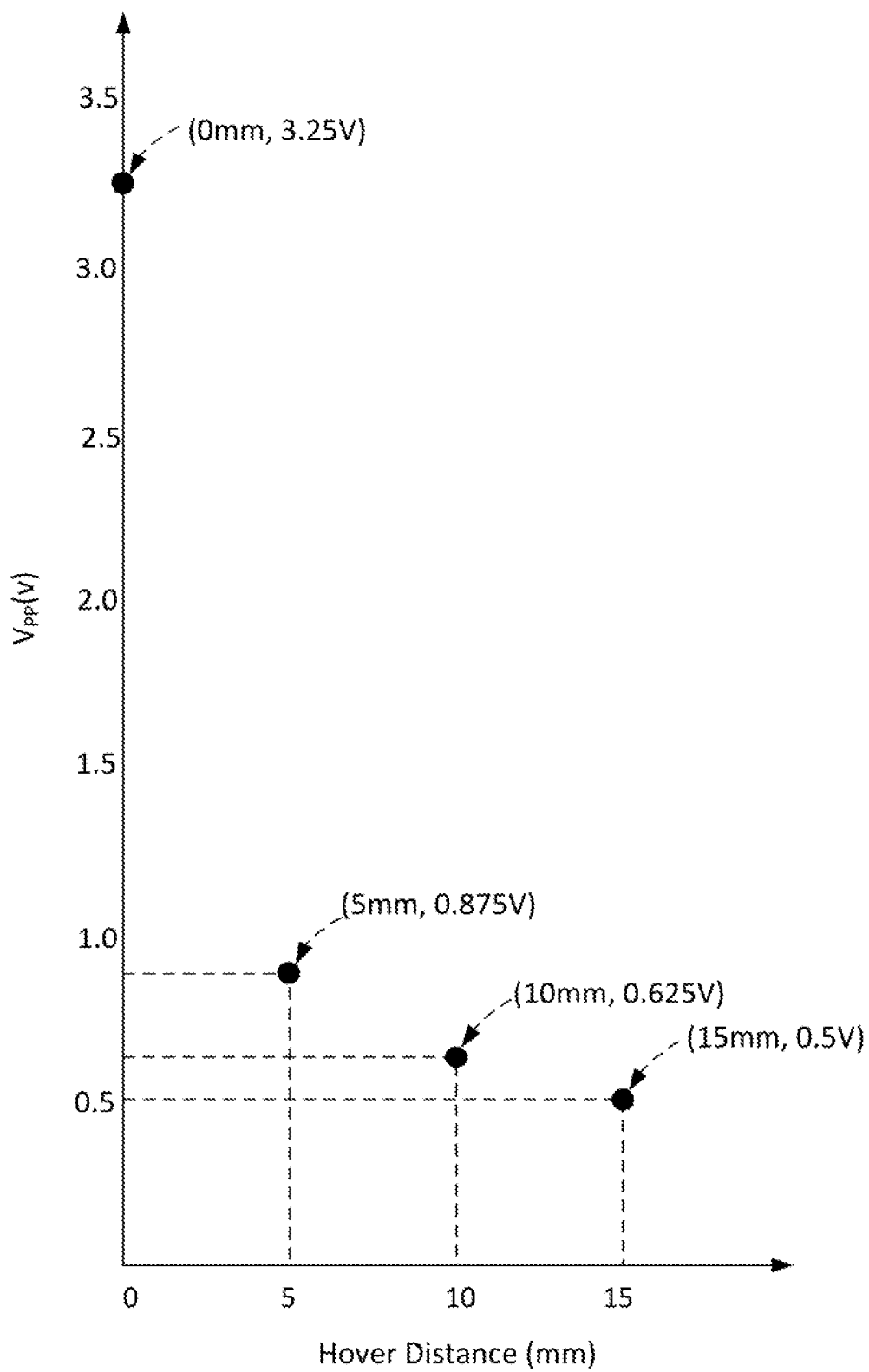
FIG. 12 illustrates example peak-to-peak voltage amplitudes ($V_{pp}$) of a signal received at a touch sensor in response to example hover distances of an active stylus from the touch sensor.

FIG. 12 illustrates example peak-to-peak voltage amplitudes ($V_{pp}$) of signal 412 received at touch sensor 10 in response to example hover distances of active stylus 200 from touch sensor 10. In the example of FIG. 12, stylus controller 306 may not adapt the actual transmit voltage of signal 412. As an example and not by way of limitation, transmitter 402 may transmit signal 412 to touch sensor 10 at a fixed voltage. In particular embodiments, $V_{pp}$ of signal 412 received at touch sensor 10 may include a $V_{pp}$ of a measurement signal provided by a sense unit of touch-sensor controller 12 of touch sensor 10 in response to the received signal 412 as discussed above. In the example of FIG. 12, signal 412 may be transmitted by transmitter 402 of stylus controller 306. In particular embodiments, hover distance may correspond to distance 904 of active stylus 200 from surface 902 of touch sensor 10 as illustrated in FIG. 9B. In the example of FIG. 12 and further referencing FIG. 9A, at a hover distance of 0 mm, tip 220 of active stylus 200 may press against surface 902 of touch sensor 10 and touch sensor 10 may receive signal 412 whose $V_{pp}$ may be substantially equivalent to 3.25V. Furthermore, referencing FIG. 9B, at a hover distance (e.g., distance 904) of 5 mm, touch sensor 10 may receive signal 412 whose $V_{pp}$ may be substantially equivalent to 0.875V. At a hover distance of 10 mm, touch sensor 10 may receive signal 412 whose $V_{pp}$ may be substantially equivalent to 0.625V. At a hover distance of 15 mm, touch sensor 10 may receive signal 412 whose $V_{pp}$ may be substantially equivalent to 0.5V. As such, as hover distance of active stylus 200 increases, a $V_{pp}$ of signal 412 received at touch sensor 10 may decrease. In particular embodiments, as $V_{pp}$ of signal 412 received at touch sensor 10 decreases, a SNR of signal 412 received at touch sensor 10 may decrease. In particular embodiments, it may be desirable to regulate a substantially constant SNR of signal 412 across pre-determined range of hover distances (e.g., approximately 0 mm to 15 mm) in order to maintain communication between active stylus 200 and touch sensor 10. As an example and not by way of limitation, as hover distance of active stylus 200 increases, stylus controller 306 may be operable to adaptively increase actual transmit voltage of transmitter 402 to compensate for the decreasing SNR of signal 412, as discussed above. As such, at higher hover distances (e.g., approximately 5 mm to 20 mm), active stylus 200 may communicate with touch sensor 10 without any substantial loss in SNR of signal 412. Although the disclosure describe or illustrates particular relationship between particular voltage amplitudes of particular signal received at particular touch sensor in response to particular hover distances of particular active stylus from the touch sensor, the disclosure contemplates any suitable voltage amplitudes of any suitable signal received at any suitable touch sensor in response to any suitable hover distances of any suitable active stylus from the touch sensor in any suitable manner.

Figure 13:
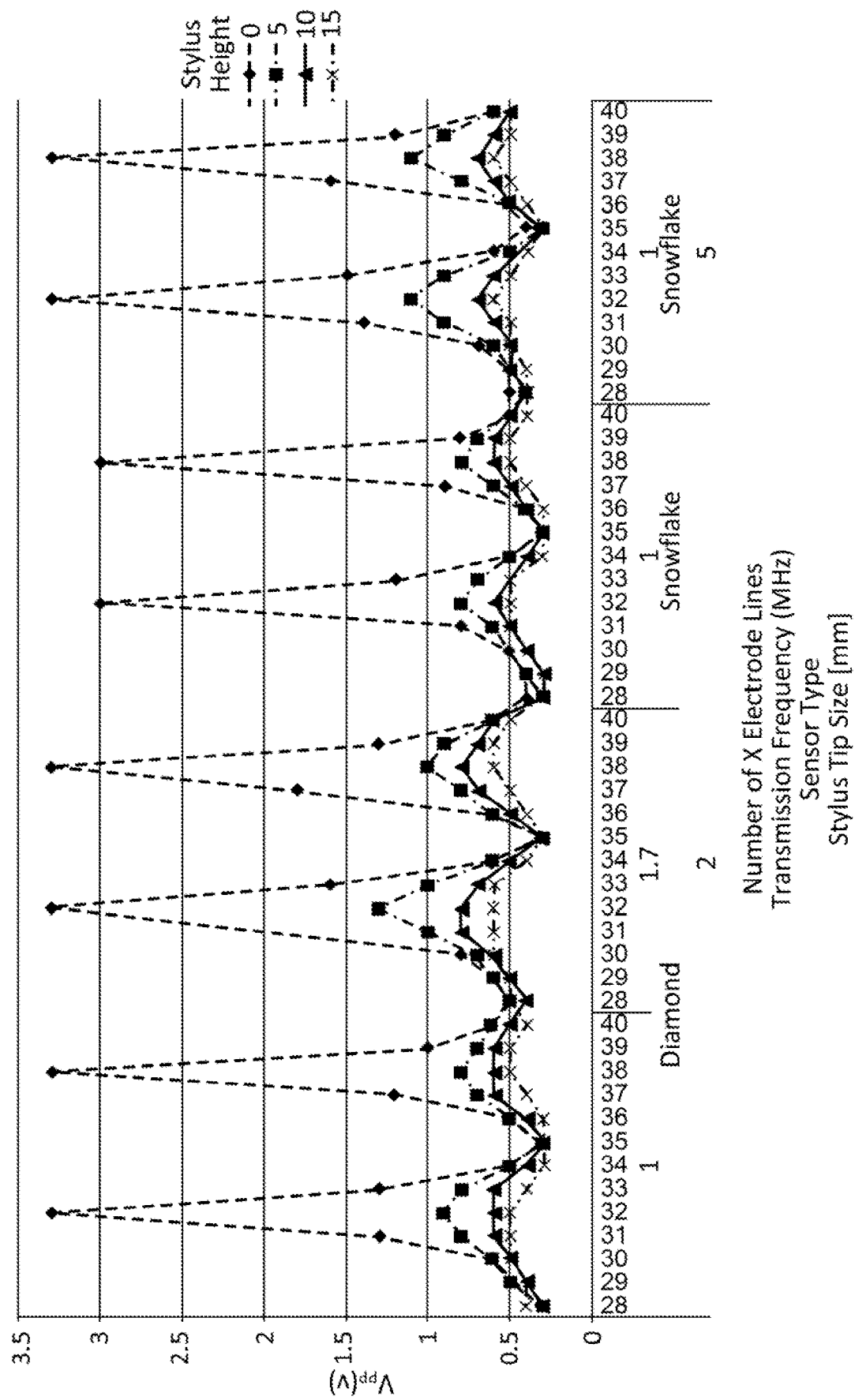
FIG. 13 illustrates example peak-to-peak voltage amplitudes ($V_{pp}$) of a signal received at a touch sensor in response to example hover distances of an active stylus from the touch sensor, and further based on example numbers of X electrode lines of the touch sensor, example transmission frequencies of a signal from the active stylus to the touch sensor, example electrode shapes of the touch sensor, and example sizes of a tip of the active stylus.

FIG. 13 illustrates example peak-to-peak voltage amplitudes ($V_{pp}$) of signal 412 received at touch sensor 10 in response to example hover distances of active stylus 200 from touch sensor 10, and further based on example numbers of X (e.g., drive) electrode lines of touch sensor 10, example transmission frequencies of signal 412 from active stylus 200 to touch sensor 10, example electrode shapes of touch sensor 10, and example sizes of tip 220 of active stylus 200. In particular embodiments, the peak-to-peak voltage amplitudes ($V_{pp}$) of signal 412 received at touch sensor 10 may correspond to a peak-to-peak voltage amplitudes ($V_{pp}$) of signal 412 seen on a sense electrode line of touch sensor 10. Herein, reference to hover distances of active stylus 200 from touch sensor 10 may encompass stylus heights of active stylus 200 from touch sensor 10, or vice-versa, where appropriate. In the example of FIG. 13, $V_{pp}$ for signal 412 may be illustrated for combination of stylus heights of 0 mm, 5 mm, 10 mm, and 15 mm, 28 to 40× electrode lines, transmission frequencies of 1 MHz and 1.7 MHz, electrode shapes of diamond and snowflake, and tip 220 sizes of 2 mm and 5 mm. In particular embodiments, it may be desirable for active stylus 200 to maintain consistent communication with touch sensor 100 at stylus heights of approximately 5 mm to 10 mm. As an example and not by way of limitation, as discussed above, active stylus 200 may adaptively increase actual transmit voltage of signal 412 in order to maintain sensitivity of touch-sensor controller 12 to communications with active stylus 200. As such, the adaptive increase in the actual transmit voltage of signal 412 may allow touch sensor 10 to detect signal 412 from active stylus 200. In contrast, as further discussed above, at a stylus height of approximately 0 mm (e.g., tip 220 of active stylus 200 touches touch sensor 10), active stylus 200 may adaptively reduce actual transmit voltage of signal 412. As such, the adaptive decrease in the actual transmit voltage of signal 412 may allow touch sensor 10 to reduce power consumption (e.g., current draw of active stylus 200) at an expense of the sensitivity of touch-sensor controller 12 to communications with active stylus 200. Although the disclosure describes or illustrates particular relationships between particular voltage amplitudes of particular signal received at touch sensor 10 in response to particular hover distances of active stylus 200 from touch sensor 10 and further based on particular numbers of particular electrode lines of touch sensor 10, particular transmission frequencies of particular signal from active stylus 200 to touch sensor 10, particular electrode shapes for touch sensor 10, and particular sizes of particular tip of active stylus 200, the disclosure contemplates any suitable voltage amplitudes of any suitable signal received at any suitable touch sensor in response to any suitable hover distances of any suitable active stylus from the touch sensor and further based on any suitable numbers of any suitable electrode lines of the touch sensor, any suitable transmission frequencies of any suitable signal from the active stylus to the touch sensor, any suitable electrode shapes of the touch sensor, and any suitable sizes of any suitable tip of the active stylus in any suitable manner.

Figure 14:
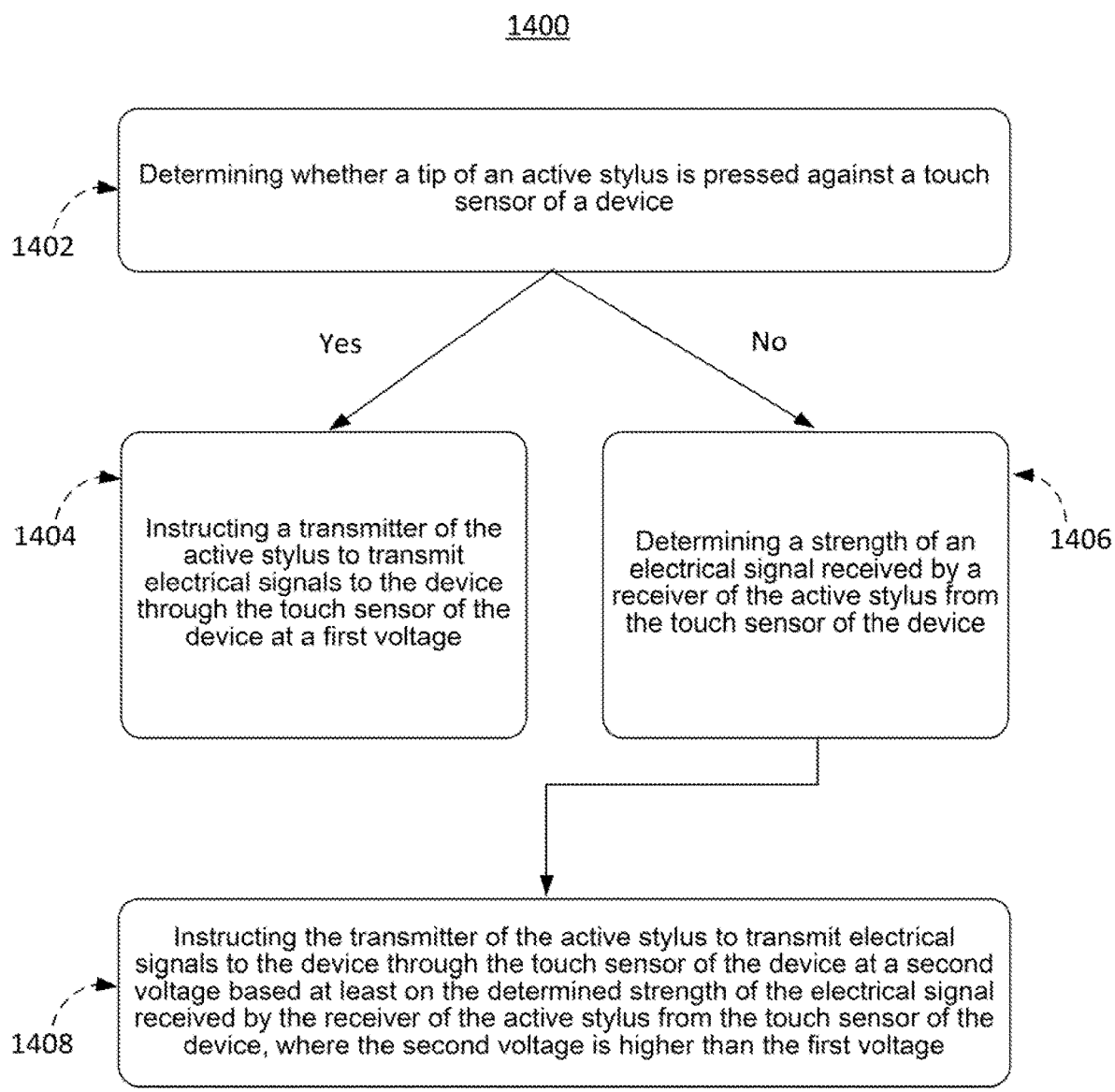
FIG. 14 illustrates an example method for adapting actual transmit voltage of an active stylus.

FIG. 14 illustrates method 1400 for adapting actual transmit voltage of active stylus 200. As an example and not by way of limitation, method 1400 may be operated by stylus controller 306 of active stylus 200. Furthermore, active stylus 200 may be a Tx/Rx active stylus, as discussed above. At step 1402, stylus controller 306 may determine whether a tip of active stylus 200 is pressed against a touch sensor of a device. As an example and not by way of limitation, referencing FIG. 4, pressure detector 408 of stylus controller 306 may determine whether tip 220 (i.e., the tip) of active stylus 200 is pressed against touch sensor 10 (i.e., the touch sensor) of a computing device. As another example and not by way of limitation, the device may be a touch screen. In particular embodiments, the tip of active stylus 200 may include one or more pressure sensors. In particular embodiments, referencing FIG. 9A, pressure detector 408 may determine whether tip 220 of active stylus 200 is pressed against surface 902 of touch sensor 10. At step 1404, if the tip of active stylus 200 is pressed against the touch sensor of the device, stylus controller 306 may instruct a transmitter of active stylus 200 to transmit electrical signals to the device through the touch sensor of the device at a first voltage. As an example and not by way of limitation, referencing FIG. 4, if tip 220 of active stylus 200 is pressed against touch sensor 10 of the computing device, adaptive control algorithm 406 may instruct transmitter 402 of active stylus 200 to transmit signal 412 to the computing device through touch sensor 10 of the computing device at a first actual transmit voltage (i.e., the first voltage). In contrast, at step 1406, if the tip of active stylus 200 is not pressed against the touch sensor of the device, stylus controller 306 may determine a strength of an electrical signal received by a receiver of active stylus 200 from the touch sensor of the device. As an example and not by way of limitation, referencing FIG. 4, if tip 220 of active stylus 200 is not pressed against touch sensor 10 of the computing device, receiver 410 of stylus controller 306 may determine a strength (e.g., $V_{pp}$) of signal 414 received by receiver 410 from touch sensor 10 of the computing device. In particular embodiments, signal 414 may synchronize communication between active stylus 200 and a controller (e.g., touch-sensor controller 12) of touch sensor 10. In particular embodiments, if active stylus 200 corresponds to a Tx-only active stylus as discussed above, there may not be receiver 410 in active stylus 200. Instead, adaptive control algorithm 406 may instruct transmitter 402 of active stylus 200 to transmit signal 412 to the computing device through touch sensor 10 at a pre-determined and fixed second actual transmit voltage that is higher than the first actual transmit voltage. At step 1408, stylus controller 306 may instruct the transmitter of the active stylus to transmit electrical signals to the device through the touch sensor of the device at a second voltage based at least on the determined strength of the electrical signal received by the receiver of the active stylus from the touch sensor of the device. Furthermore, the second voltage may be higher than the first voltage. As an example and not by way of limitation, referencing FIG. 4, adaptive control algorithm 406 may instruct transmitter 402 to transmit signal 412 to the computing device through touch sensor 10 of the computing device at a second actual transmit voltage based at least on the determined strength of signal 414 received by receiver 410 from touch sensor 10 of the computing device, where the second actual transmit voltage may be higher than the first actual transmit voltage. In particular embodiments, the first and second actual transmit voltages may be based on a SNR of signal 412, a transmission payload of signal 412, an output capacitive load of transmitter 402 as seen by signal 412, or any suitable combinations thereof. Although this disclosure describes or illustrates particular steps of method 1400 as occurring in a particular order, this disclosure contemplates any suitable steps of method 1400 occurring in any suitable order. Moreover, although this disclosure describes or illustrates method 1400 for adapting particular actual transmit voltage of particular active stylus including the particular steps of method 1400, this disclosure contemplates any suitable method for adapting any suitable actual transmit voltage of any suitable active stylus including any suitable steps which may include all, some, or none of method 1400, where appropriate. Furthermore, although this disclosure describes or illustrates particular components, devices, or systems carrying out particular steps of method 1400, this disclosure contemplates any suitable combination of any suitable components, devices, or systems carrying out any suitable steps of method 1400.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. An active stylus, comprising:
a receiver configured to receive signals from a device via a touch sensor of the device;
a transmitter configured to transmit signals to the device via the touch sensor of the device, wherein the transmitter is integrated with or comprises an adaptive voltage generation circuit including:
a boost voltage controller configured to perform a boost by controlling the adaptive voltage generation circuit to generate output voltage (Vout) from a voltage of a power source;
a comparator configured to measure Vout;
a switch control configured to shut off the boost when Vout is above a threshold voltage level and to allow the boost when Vout is below the threshold voltage level; and
a bleeder circuit configured to regulate Vout within a defined time; and a stylus controller coupled to the receiver and the transmitter and configured to:
(a) in a first operation state, control the adaptive voltage generation circuit and the transmitter to transmit signals at a second transmit voltage, and
(b) in a second operation state different from the first operation state, control the adaptive voltage generation circuit and the transmitter to transmit signals at a first transmit voltage lower than the second transmit voltage.

2. The active stylus according to claim 1, wherein the first operation state is a state in which a tip of the active stylus is not pressed, and the second operation state is a state in which the tip of the active stylus is pressed.

3. The active stylus according to claim 2, wherein the tip is integrated with or comprises a pressure sensor.

4. The active stylus according to claim 2, wherein the stylus controller, in response to the tip of the active stylus being pressed, transitions from sleep mode in which the transmitter and the receiver are turned off to idle mode in which the transmitter is turned off and the receiver is operable to receive signals from the touch sensor.

5. The active stylus according to claim 4, wherein, in the idle mode, the receiver is turned on in one or more time slots when synchronization is expected to occur between the active stylus and a touch sensor controller of the touch sensor.

6. The active stylus according to claim 4, wherein the stylus controller in the idle mode, in response to the receiver detecting a synchronization signal from the touch sensor, enters into active mode in which the transmitter and the receiver are turned on.

7. The active stylus according to claim 6, wherein the stylus controller enters into the idle mode in response to detecting the active stylus being lifted off a surface.

8. The active stylus according to claim 6, wherein the active stylus, in the active mode, operates in a cycle which includes a synchronization timing interval and an integration timing interval, and
(i) in the synchronization timing interval, the transmitter is turned off and the receiver is operable to receive signals from the touch sensor, and
(ii) in the integration timing interval, the transmitter is turned on.

9. The active stylus according to claim 8, wherein the cycle is defined by a frame rate of the active stylus.

10. The active stylus according to claim 9, wherein the frame rate is between 60 Hz and 200 Hz.

11. The active stylus according to claim 8, wherein the stylus controller disables the receiver during the integrating timing interval.

12. The active stylus according to claim 8, wherein the stylus controller, after achieving frequency and/or phase lock with a touch sensor controller of the touch sensor based at least on a Tx/Rx transmission sequence in the synchronization timing interval, instructs the transmitter to transmit a response to the touch sensor controller.

13. The active stylus according to claim 1, wherein the receiver is turned on for a fixed time interval after the active stylus achieves lock with the touch sensor controller.

14. A system comprising:
an active stylus; and
a touch sensor controller, operable with a touch sensor configured to transmit signals to and receive signals from the active stylus, the touch sensor controller comprising a computer-readable non-transitory storage medium embodying logic that is configured when executed to:
detect signal levels at the touch sensor according to an operation cycle, and
detect the active stylus based on the detected signal levels, wherein,
the active stylus includes an adaptive voltage generation circuit including:
a boost voltage controller configured to perform a boost by controlling the adaptive voltage generation circuit to generate output voltage (Vout) from a voltage of a power source;
a comparator configured to measure Vout;
a switch control configured to shut off the boost when Vout is above a threshold voltage level and to allow the boost when Vout is below the threshold voltage level; and
a bleeder circuit configured to regulate Vout within a defined time, and wherein,
(a) in a first operation state, the active stylus controls the adaptive voltage generation circuit to transmit signals at a second transmit voltage, and
(b) in a second operation state different from the first operation state, the active stylus controls the adaptive voltage generation circuit to transmit signals at a first transmit voltage lower than the second transmit voltage.

15. The system according to claim 14, wherein the first operation state is a state in which a tip of the active stylus is not pressed, and the second operation state is a state in which the tip of the active stylus is pressed.

16. The system according to claim 15, wherein the tip is integrated with or comprises a pressure sensor.

17. The system according to claim 14, wherein the active stylus is configured to operate in an operation cycle including a synchronization timing interval and an integration timing interval, wherein
  (i) in the synchronization timing interval, the active stylus is operable to receive signals from the touch sensor, and
  (ii) in the integration timing interval, active stylus is operable to transmit signals.

18. The system according to claim 17, wherein the operation cycle is defined by a frame rate of the active stylus.

19. The system according to claim 18, wherein the frame rate is between 60 Hz and 200 Hz.

20. The system according to claim 17, wherein the logic of the touch sensor controller, after achieving frequency and/or phase lock with the active stylus based at least on a Tx/Rx transmission sequence in the synchronization timing interval, instructs the touch sensor to receive a response from the active stylus.

\* \* \* \* \*